United States Patent
Choi et al.

(10) Patent No.: US 11,467,264 B2
(45) Date of Patent: Oct. 11, 2022

(54) APPARATUS FOR MEASURING DEPTH WITH PSEUDO 4-TAP PIXEL STRUCTURE

(71) Applicant: RESEARCH & BUSINESS FOUNDATION SUNGKYUNKWAN UNIVERSITY, Suwon-si (KR)

(72) Inventors: Jae Hyuk Choi, Seoul (KR); Dong Uk Kim, Suwon-si (KR); Jung Hoon Chun, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 405 days.

(21) Appl. No.: 16/811,015

(22) Filed: Mar. 6, 2020

(65) Prior Publication Data

US 2020/0292676 A1  Sep. 17, 2020

(30) Foreign Application Priority Data

Mar. 11, 2019 (KR) .................. 10-2019-0027771
Feb. 18, 2020 (KR) .................. 10-2020-0019818

(51) Int. Cl.
*G01S 7/4863* (2020.01)
*G01S 7/48* (2006.01)
(Continued)

(52) U.S. Cl.
CPC .......... *G01S 7/4863* (2013.01); *G01S 7/4808* (2013.01); *G01S 7/4865* (2013.01); *G01S 17/10* (2013.01); *G01S 17/894* (2020.01)

(58) Field of Classification Search
CPC ...... G01S 7/4863; G01S 7/4808; G01S 17/10; G01S 7/4865; G01S 17/894
See application file for complete search history.

(56) References Cited

U.S. PATENT DOCUMENTS 7,923,673 B2 * 4/2011 Buttgen ............ H01L 27/14812
 257/292
8,233,143 B2 * 7/2012 Cho ...................... G01S 7/4816
 356/3
(Continued)

FOREIGN PATENT DOCUMENTS

KR 10-2011-0021426 A 3/2011
KR 10-2015-0054568 A 5/2015

OTHER PUBLICATIONS

Korean Office Action dated Oct. 26, 2020 in counterpart Korean Patent Application No. 10-2020-0019818 (9 pages in Korean).

*Primary Examiner* — Seung C Sohn
(74) *Attorney, Agent, or Firm* — NSIP Law

(57) ABSTRACT

Provided is an apparatus for measuring a depth with a pseudo 4-tap pixel structure, the apparatus including a delta sigma circuit configured to calculate, through a delta sigma operation, a delta value of a first angle corresponding to a first row line of a pixel array for measuring a depth of an object and calculate, through a delta sigma operation, a delta value of a third angle corresponding to a second row line of the pixel array, a memory configured to store the calculated delta value of the first angle corresponding to the first row line, and an arithmetic logic unit (ALU) configured to compute depth information corresponding to the first row line by using the stored delta value of the first angle corresponding to the first row line and the calculated delta value of the third angle corresponding to the second row line.

23 Claims, 24 Drawing Sheets

(51) Int. Cl.
    *G01S 17/10* (2020.01)
    *G01S 7/4865* (2020.01)
    *G01S 17/894* (2020.01)

(56) References Cited

U.S. PATENT DOCUMENTS

2011/0050473 A1  3/2011  Jung et al.
2015/0130904 A1  5/2015  Bae et al.

* cited by examiner

APPARATUS FOR MEASURING DEPTH WITH PSEUDO 4-TAP PIXEL STRUCTURE

CROSS-REFERENCE TO RELATED APPLICATIONS

This application claims priority to Korean Patent Application No. 10-2019-0027771 filed on 11 Mar. 2019 and Korean Patent Application No. 10-2020-0019818 filed on 18 Feb. 2020 in Korea, the entire contents of which are hereby incorporated by reference in their entirety.

BACKGROUND

1. Technical Field

The present disclosure relates to an apparatus for measuring a depth with a pseudo 4-tap pixel structure.

2. Description of Related Art

Recently, as the demand for smart phones soared, development of image sensors included in the smart phones has been actively conducted. An image sensor includes a plurality of pixels that convert photons in a spectral band into electrons.

In order to obtain a 3D image, it is necessary to obtain not only color but also information about a depth between an object and an image sensor. As an exemplary scheme of using an emitted light to obtain a depth image, there are two well-known scheme.

One scheme is a triangulation scheme which uses an incident angle and a reflected angle by irradiating an irradiation light to an object. The other scheme is a time of flight (TOF) scheme that uses the time for a light to be irradiated, reflected and then return. The TOF scheme generates a depth image in real time because the measurement time is shorter than that of the triangulation scheme. However, in the depth image generated by the TOF scheme, a depth value distortion may occur due to saturation that is caused, for example, by a short shooting distance or a large reflectivity of an object.

The TOF scheme includes a direct TOF scheme and an indirect TOF scheme.

FIGS. 1 through 3 are diagrams for explaining a general TOF scheme.

As shown in FIG. 1, a light emitted from an infrared (IR) emitter is reflected by an object to be measured in distance, and is then received by a detector. At this point, the TOF scheme calculates a distance R by measuring a round trip time of the emitted light. A depth map for the object may be calculated from the calculated distance.

As shown in FIG. 2, the direct TOF scheme detects a light, emitted from an IR emitter, through a sensor array including a single-photon avalanche diode and the like. In this case, a controller may calculate a distance D by using an equation $D=(C/2) \cdot \Delta t$ in which a contact time difference $\Delta t$ is reflected.

As shown in FIG. 3, the indirect TOF scheme detects a light, emitted from an IR emitter, through a sensor array including a demodulation pixel and the like. In this case, the controller may calculate the distance D by using an equation $D=(C/2) \cdot (\Delta\varphi/2\pi f)$ in which an indirect phase difference $\Delta\varphi$ between a transmission wave and a reception wave of a specific frequency f, rather than a direct time difference, is reflected.

FIG. 4 is a diagram for explaining a general pulse TOF scheme.

An emitted infrared ray (IR) p(t, 0), a returned IR $A \cdot p(t,\theta)$, and a received light (IR+BGL) are shown in FIG. 4.

The emitted IR may be represented by a square wave function. A photocurrent from a received light may be expressed as $I_{PH}(t)=B+A \cdot p(t,\theta)$ After the emitted IR reciprocate, light attenuation A and delay θ occur. In addition, background light B is generated by sunlight or room lighting. If it is assumed that the background light B is 0, a delayed phase difference θ may be found using 2-phase demodulation which is a simple demodulation scheme.

FIG. 5 is a diagram for explaining a general 2-phase demodulation scheme.

An emitted IR, a returned IR, a waveform of a first transfer switch $TX_1$ modulated by p(t,0), a waveform of a second transfer switch $TX_2$ modulated by p(t,π), and a background light BGL are illustrated in FIG. 5. The amounts of charge corresponding to the first transfer switch $TX_1$ and the second transfer switch $TX_2$ are Q(0) and Q(π).

A phase shift θ may be easily calculated by a charge ratio as shown in Equation 1 below.

$$\theta = \pi \cdot \frac{Q(\pi)}{Q(0) + Q(\pi)} \qquad \text{[Equation 1]}$$

Here, θ represents a phase shift, Q(π) represents a charge amount from the second transfer switch $TX_2$, and Q(0)+Q(π) represents a total charge amount.

However, if there is background light BGL, 4-phase demodulation is required.

FIGS. 6 and 7 are diagrams for explaining a general 4-phase demodulation scheme.

An emitted IR, a returned IR, a background light BGL, a waveform of the first transmitted switch $TX_1$ modulated by p(t,0), and a waveform of the second transfer switch $TX_2$ modulated by p(t,π) are shown in FIG. 6.

A charge amount difference $\Delta Q(\theta)$ at φ is calculated as shown in Equation 2 below.

$$\Delta Q(\theta)=Q(\theta)-Q(\theta+\pi) \qquad \text{[Equation 2]}$$

For example, a charge amount difference at 0 is calculated as shown in Equation 3 below.

$$\Delta Q(0)=Q(0)+V-(Q(\pi)+V)=Q(0)-Q(\pi) \qquad \text{[Equation 3]}$$

By using BGL (B, offset), the offset is removed from both charge amounts through differential charge $\Delta Q$. The differential charge $\Delta Q$ has two unknown numbers A and φ. Therefore, two different charge amounts are needed to solve two unknown numbers.

$$\theta = \begin{cases} \frac{\pi}{2} \cdot \left(1 + \frac{-\Delta Q(0)}{|\Delta Q(0)| + |\Delta Q(\pi/2)|}\right), & \text{if } \Delta Q\left(\frac{\pi}{2}\right) \geq 0 \\ \frac{\pi}{2} \cdot \left(3 + \frac{+\Delta Q(0)}{|\Delta Q(0)| + |\Delta Q(\pi/2)|}\right), & \text{if } \Delta Q\left(\frac{\pi}{2}\right) < 0 \end{cases} \qquad \text{[Equation 4]}$$

As shown in FIG. 7, θ may be determined only from two differential charge amounts $\Delta Q(0)$ and $\Delta Q(\pi/2)$. Using 4 phases, 0 may be known up to 2π.

FIGS. 8 through 10 are diagrams for explaining an operation of an existing delta sigma BGL suppressing apparatus.

The existing delta sigma suppressing apparatus suppresses a background light BGL through a delta sigma operation using data of two frames, that is, Frame #1 and Frame #2.

In operation of the Frame #1, the pixel 110 may receive a modulated pulse and output a signal, integrated at a floating diffusion node (FD) by $TX_1$ (0) and $TX_2$ ($\pi$), as V(0) and V($\pi$) through a source follower.

Through a delta signal operation, an analog delta sigma (Analog $\Delta\Sigma$) circuit 120 may prevent saturation caused by BGL and outputs $\Delta V(0)$.

The analog-to-digital converter (ADC) 130 may convert $\Delta V(0)$ into a digital code. The converted code $\Delta V(0)$ may be stored in the memory 140.

In operation of the Frame #2, the pixel 110 may receive a modulated pulse and output a signal, integrated at a floating diffusion (FD) node by $TX_1$ ($\pi/2$) and $TX_2$ ($3\pi/2$), as V($\pi/2$) and V($3\pi/2$) through the source follower.

Through a delta signal operation, the analog delta sigma circuit 120 may prevent saturation caused by BGL and output $\Delta V(\pi/2)$.

An analog-to-digital converter (ADC) 130 may convert $\Delta V(\pi/2)$ into a digital code.

An arithmetic logic unit (ALU) 150 may convert into depth information by using the code $\Delta V(0)$ stored in the memory 140 of the Frame #1 and the code $\Delta V(\pi/2)$ output from the ADC 130.

As shown in FIG. 10, Frame #1 and Frame #2 are required to obtain $\Delta V(0)$ and $\Delta V(\pi/2)$ necessary for depth information conversion.

Since the existing delta sigma BGL suppressing method requires $\Delta V(0)$ and $\Delta V(\pi/2)$, respectively, frame memories as many as the number of pixel arrays multiplied by the bit of the ADC is required, which requires an area as large as the frame memories.

As described above, in an operation for removing background light on the basis of a 2-tap pixel, a large amount of memory is required because data of two frames is conventionally required. As a result, area occupation increases as the memories increase. In addition, a frame rate of the system is low, which is good in terms of speed.

SUMMARY

In general, in a circuit system, the faster the frame rate, the better it is. In addition, the smaller the chip is, the lower the cost is in the case of mass production. An area may be reduced using the two ideas, and system performance may be improved by increasing an operating speed.

Accordingly, Exemplary embodiments according to the present disclosure provides an apparatus for measuring a depth with a pseudo 4-tap pixel, the apparatus which does not use a large area, and calculate the frame rate by using one frame data to calculate the frame rate. An object of the present disclosure is to provide a virtual distance measuring device having a four-tap pixel structure.

According to one example embodiment of the present disclosure, there is provided an apparatus for measuring a depth with a pseudo 4-tap pixel structure, the apparatus including: a delta sigma circuit configured to calculate, through a delta sigma operation, a delta value of a first angle corresponding to a first row line of a pixel array for measuring a depth of an object and calculate, through a delta sigma operation, a delta value of a third angle corresponding to a second row line of the pixel array, a memory configured to store the calculated delta value of the first angle corresponding to the first row line, and an arithmetic logic unit (ALU) configured to compute depth information corresponding to the first row line by using the stored delta value of the first angle corresponding to the first row line and the calculated delta value of the third angle corresponding to the second row line.

The apparatus may further include an analog-to-digital converter (ADC) configured to convert the calculated delta value of the first angle corresponding to the first row line and the calculated delta value of the third angle corresponding to the second row line into digital codes.

The delta sigma circuit may be configured to perform a delta sigma operation by using voltage values at the first angle and a second angle, the voltage values generated by a modulation pulse on the first row line of the pixel array.

The delta sigma circuit may be configured to perform a delta sigma operation by using voltage values at the third angle and a fourth angle, the voltage values generated by a modulation pulse on the second row line of the pixel array.

The pixel array may have a structure in which the first row line and the second row line are alternately repeated.

The memory may be configured to store the delta value of the first angle corresponding to the first row line of the pixel array, and, after the stored delta value of the first angle is computed by the ALU, store the delta value of the third angle corresponding to the second row line of the pixel array.

The ALU may be configured to compute depth information corresponding to the second row line by using the stored delta value of the third angle corresponding to the second row line and a delta value of the first angle corresponding to a third row line.

Meanwhile, according to another example embodiment of the present disclosure, there is provided an apparatus for measuring a depth with a pseudo 4-tap pixel structure, the apparatus including a delta sigma circuit configured to calculate, through a delta sigma operation, a delta value of a first angle corresponding to a first row line of a pixel array for measuring a depth of an object and calculate, through a delta sigma operation, a delta value of a third angle corresponding to a second row line of the pixel array, a memory configured to store the calculated delta value of the first angle corresponding to the first row line, and an arithmetic logic unit (ALU) configured to compute depth information corresponding to a merged line of the first and second row lines by using the stored delta value of the first angle corresponding to the first row line and the calculated delta value of the third angle corresponding to the second row line.

The apparatus may further include an analog-to-digital converter (ADC) configured to convert the calculated delta value of the first angle corresponding to the first row line and the calculated delta value of the third angle corresponding to the second row line into digital codes.

The delta sigma circuit may be configured to perform a delta sigma operation by using voltage values at the first angle and a second angle, the voltage values generated by a modulation pulse on the first row line of the pixel array.

The delta sigma circuit may be configured to perform a delta sigma operation by using voltage values at the third angle and a fourth angle, the voltage values generated by a modulation pulse on the second row line of the pixel array.

The pixel array may have a structure in which the first row line and the second row line are alternately repeated.

The ALU may be configured to compute depth information corresponding to a merged line of every two row lines after computing the depth information corresponding to the merged line of the first and second row lines.

Meanwhile, according to another example embodiment of the present disclosure, there is provided an apparatus for measuring a depth with a pseudo 4-tap pixel structure, the apparatus including a delta signal circuit configured to calculate a delta value of a first angle corresponding to a first row line of a pixel array for measuring a depth of an object, a delta value of a third angle corresponding to a second row line of the pixel array, and a delta value of the first angle corresponding to a third row line of the pixel array, a memory configured to store the calculated delta value of the first angle corresponding to the first row line, the delta value of the third angle corresponding to the second row line, and the delta value of the first angle corresponding to the third row line, and an arithmetic logic unit (ALU) configured to reconstruct the delta value of the first angle corresponding to the second row line by interpolating the stored delta value of the first angle corresponding to the first row line and the delta value of the first angle corresponding to the third row line, and compute depth information corresponding to the second row line by using the reconstructed delta value of the first angle corresponding to the second row line and the stored delta value of the third angle corresponding to the second row line.

The apparatus may further include an analog-to-digital converter (ADC) configured to convert the calculated delta value of the first angle corresponding to the first row line, the calculated delta value of the third angle corresponding to the second row line, and the calculated delta value of the first angle corresponding to the third row line into digital codes.

The delta sigma circuit may be configured to perform a delta sigma operation by using voltage values at the first angle and a second angle, the voltage values generated by a modulation pulse on the first row line of the pixel array.

The delta sigma circuit may be configured to perform a delta sigma operation by using voltage values at the third angle and a fourth angle, the voltage values generated by a modulation pulse on the second row line of the pixel array.

The pixel array may have a structure in which the first row line and the second row line are alternately repeated.

The delta sigma circuit may be configured to calculate a delta value of the third angle corresponding to a fourth row line, and the ALU may be configured to reconstruct the delta value of the third angle corresponding to the third row line by interpolating the stored delta value of the third angle corresponding to the second row line and the calculated delta value of the third angle corresponding to the fourth row line.

The ALU may be configured to compute depth information corresponding to the third row line by using the reconstructed delta value of the third angle corresponding to the third row line and the stored delta value of the first angle corresponding to the third row line.

The apparatus may further include an alternate phase driver configured to perform an alternate phase operation of alternately outputting different phases on a same row line of each frame.

The ALU may be configured to detect occurrence of a motion by comparing a pixel data difference with a predetermined threshold, and perform a hybrid depth imaging operation, in which a depth calculated based on one frame is used at a portion where the motion occurs and a depth calculated based on two frames is used at a portion where the motion does not occur.

The ALU may be configured to calculate weights of edge by adding differences between delta values of predetermined angles on adjacent row lines, and interpolate a portion where an edge occurs by using edge coefficients calculated based on the weights of edge.

According to exemplary embodiments of the present disclosure, since a frame memory is not used, a large area may not be used, and a frame rate may be improved by calculating depth information using one frame data.

DETAILED DESCRIPTION OF EXAMPLE EMBODIMENTS

Figure 1:
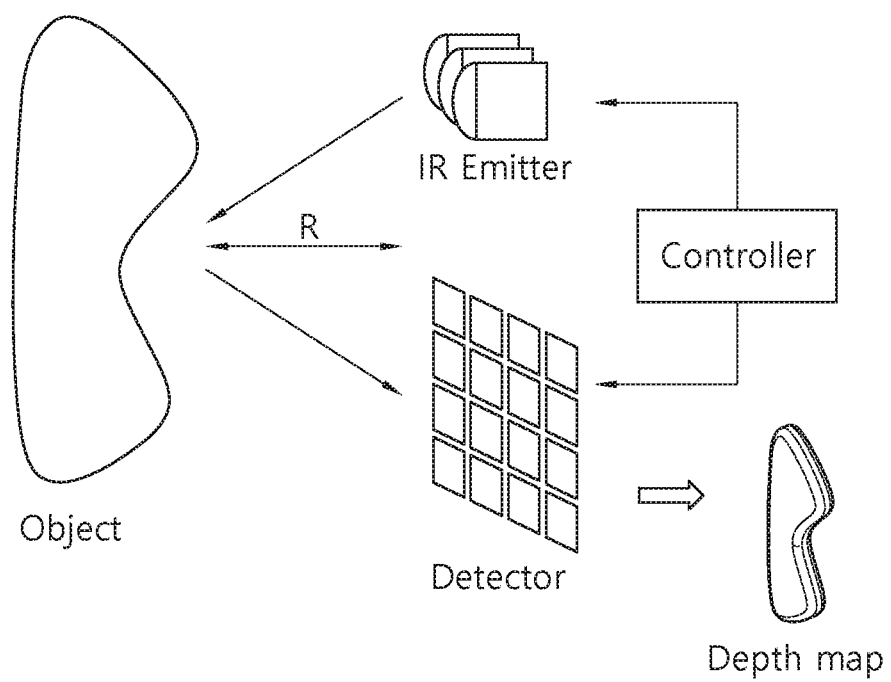
FIGS. 1 through 3 are diagrams for explaining a general time of flight (TOF) scheme.
Figure 2:
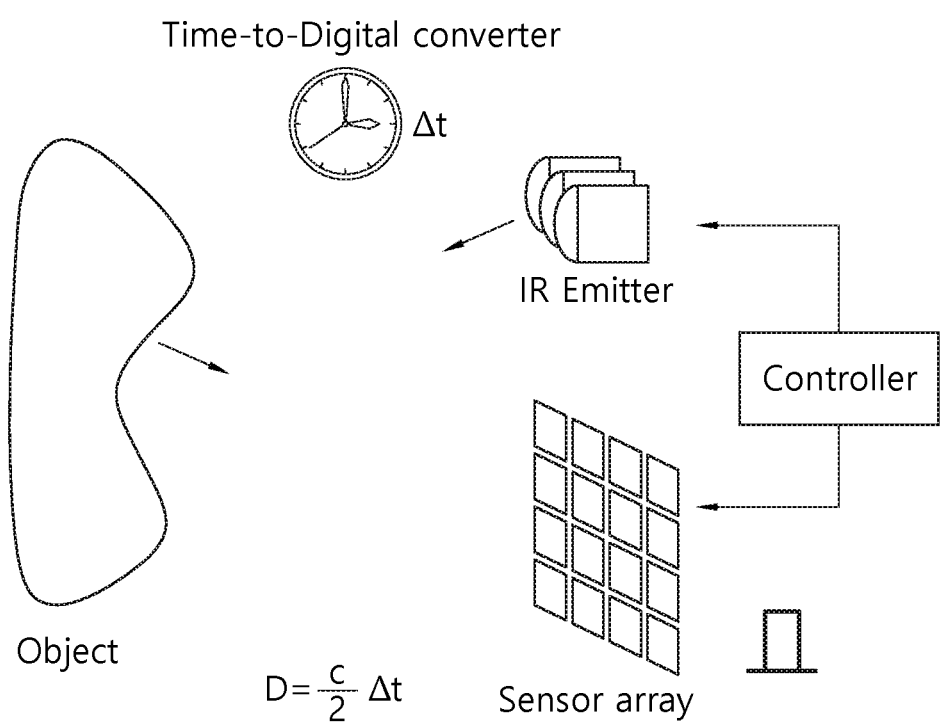
Figure 3:
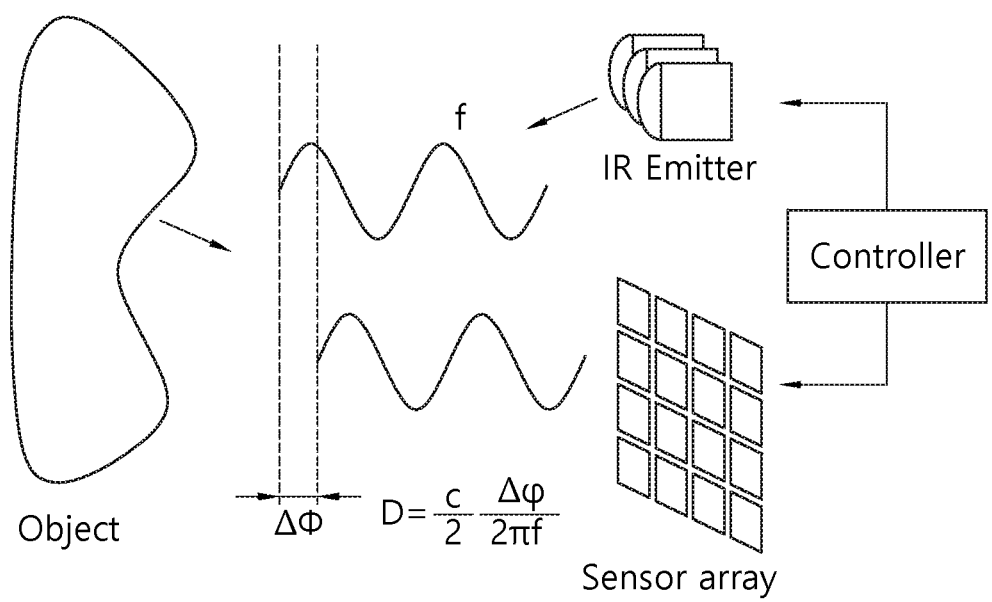
Figure 4:
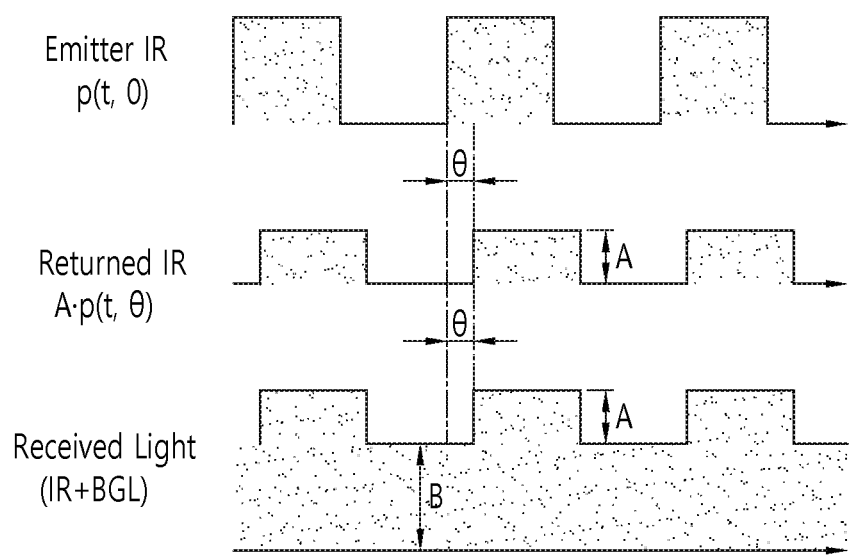
FIG. 4 is a diagram for explaining a general pulse TOF scheme.
Figure 5:
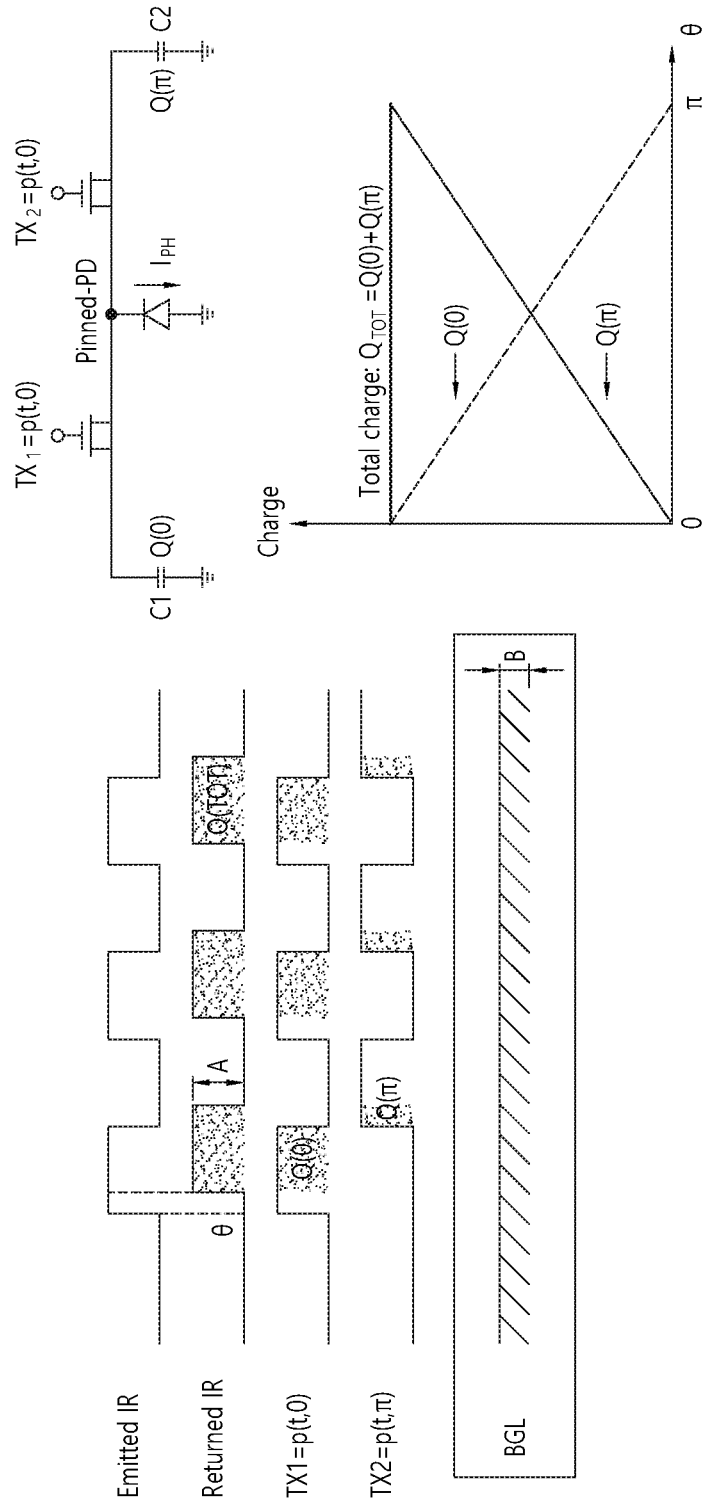
FIG. 5 is a diagram for explaining a general 2-phase demodulation scheme.
Figure 6:
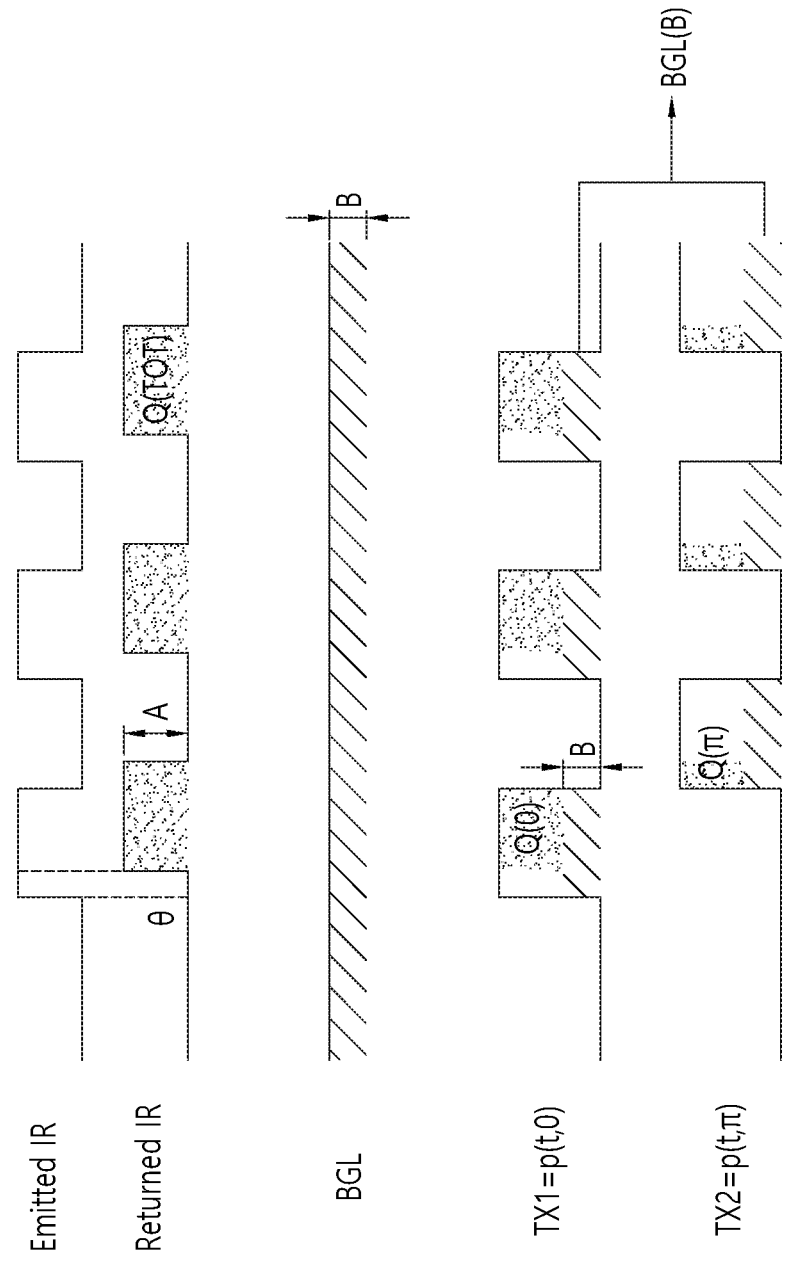
FIGS. 6 and 7 are diagrams for explaining a general 4-phase demodulation scheme.
Figure 7:
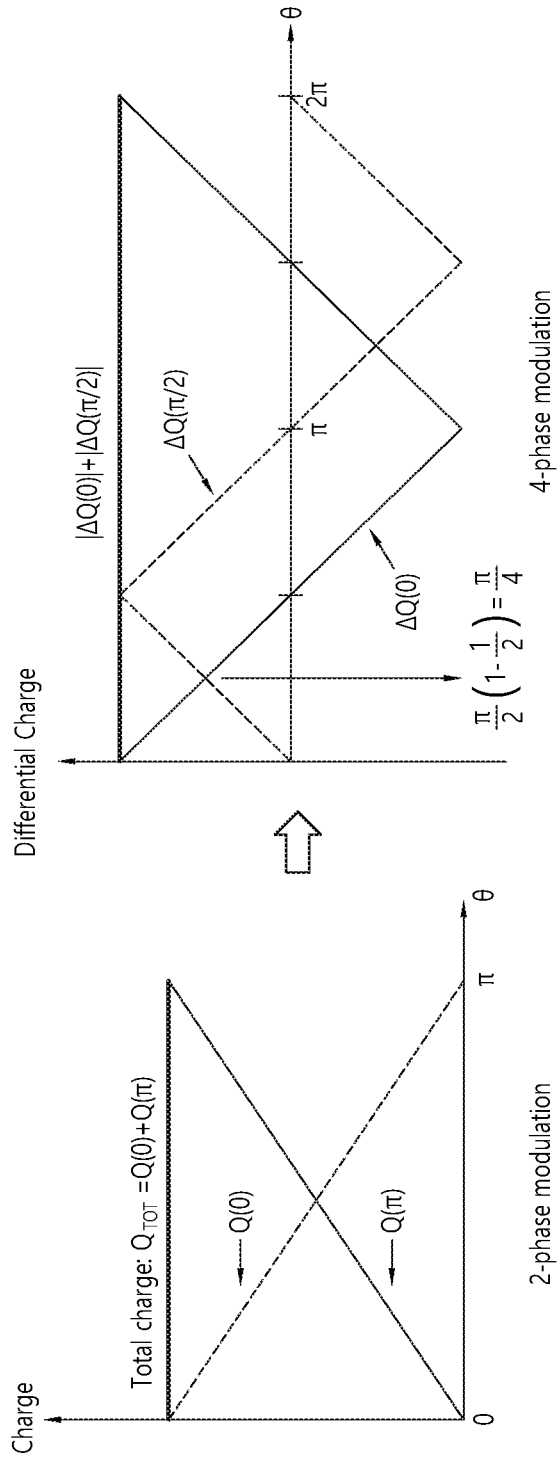
Figure 8:
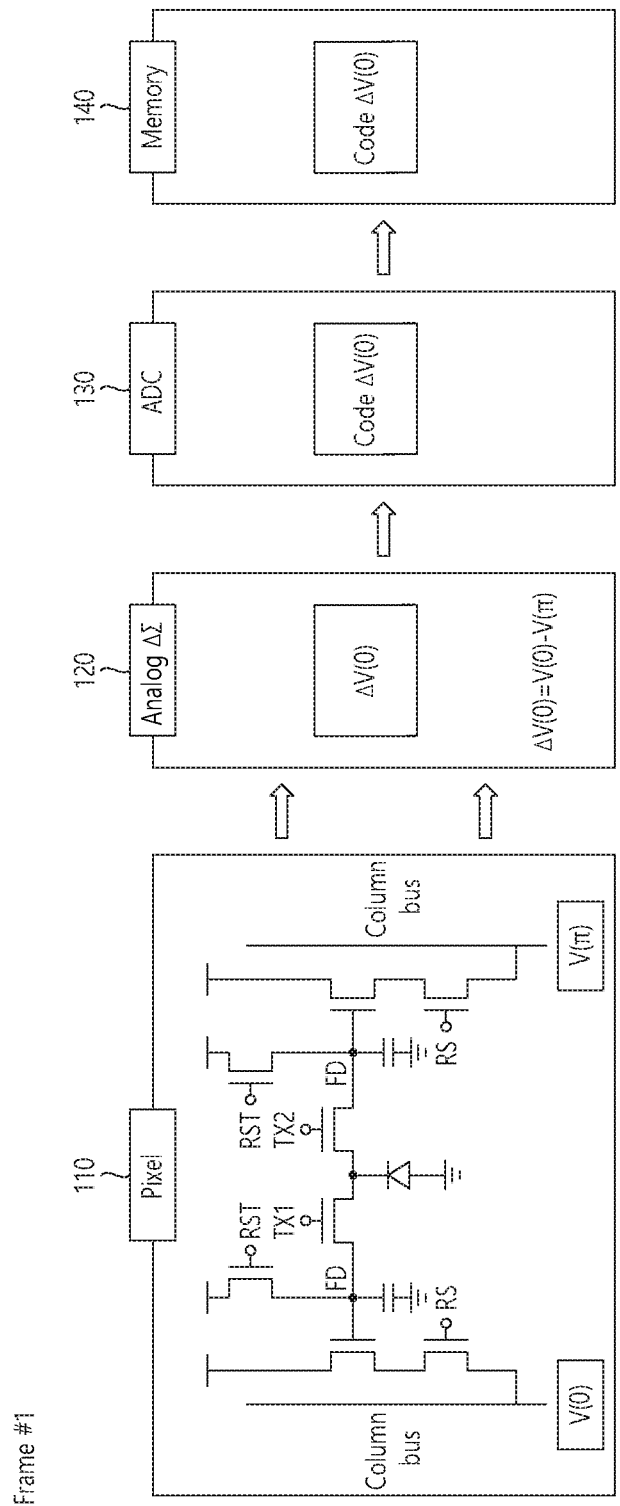
FIGS. 8 through 10 are diagrams for explaining an operation of an existing delta sigma BGL suppressing apparatus.
Figure 9:
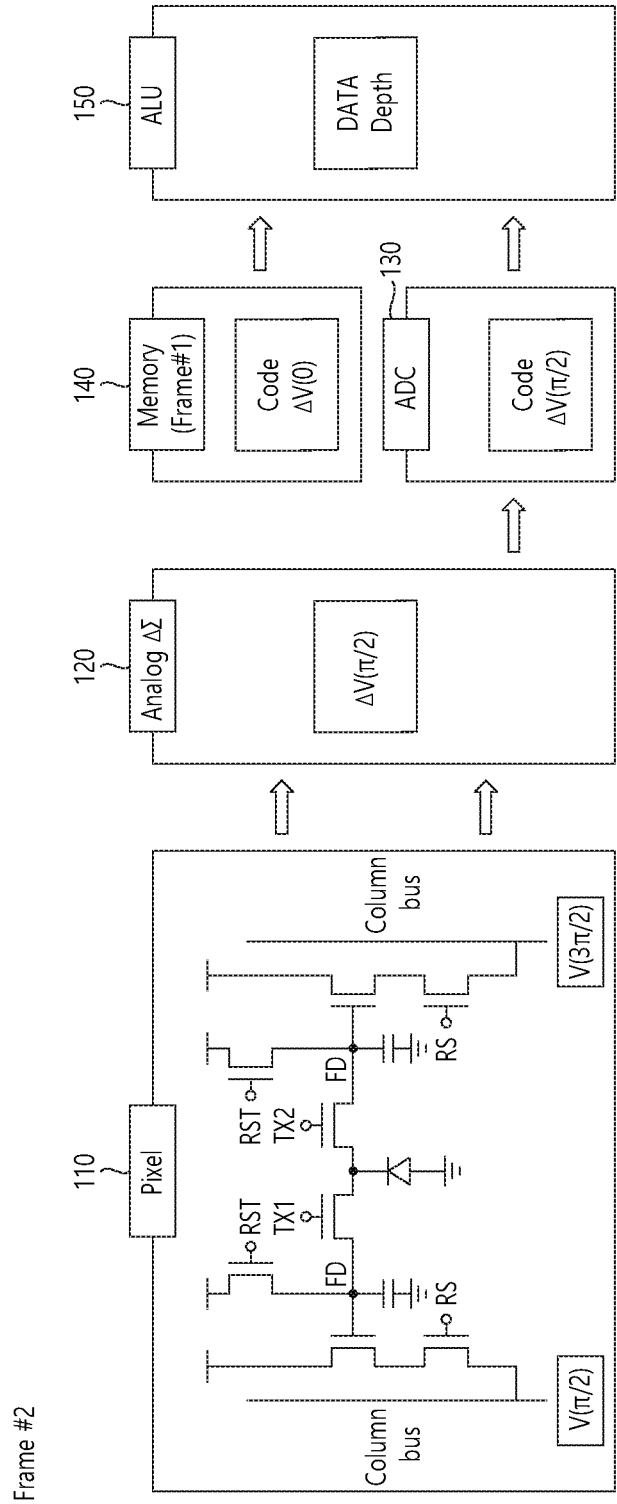
Figure 10:
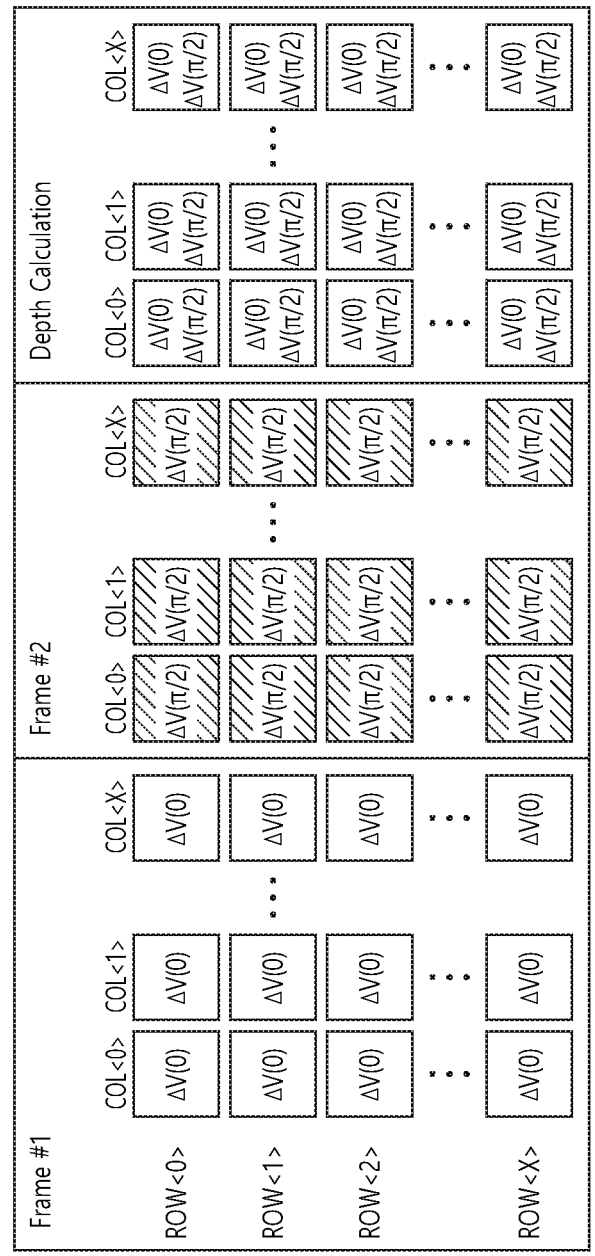

The invention may be variously modified in various forms and may have various embodiments, and specific embodiments thereof will be illustrated in the drawings and described in detail.

However, it should be appreciated that the present disclosure is not limited to a specific embodiment and all modifications, equivalents and/or alternatives thereof also belong to the scope of the present disclosure.

Terms "first" and "second" may modify various elements regardless of importance and/or order. These terms are used only to distinguish one element from another element without limitation. For example, a first element may be named a second element without departing from the scope of the present disclosure. Likewise, a second element may be named a first element. A term "and/or" should be understood to include all combinations which may be presented from one or more related items.

When it is said that one element is described as being "connected" to the other element, the one element may be directly connected to the other element, but it should be understood that another element may be interposed between the two elements. In contrast, when it is said that one element is described as being "directly connected" to the other element, it should be understood that another element is not interposed between the two elements.

The terminology used herein is for the purpose of describing particular example embodiments only and is not intended to be limiting of the present disclosure. An expression of the singular number should be understood to include plural expressions, unless clearly expressed otherwise in the context. Terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

Unless indicated otherwise, it is to be understood that all the terms used in the specification including technical and scientific terms has the same meaning as those that are understood by those skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in more detail with reference to the accompanying drawings. In order to facilitate the general understanding of the present disclosure in describing the present disclosure, through the accompanying drawings, the same reference numerals will be used to describe the same components and an overlapped description of the same components will be omitted.

Figure 11:
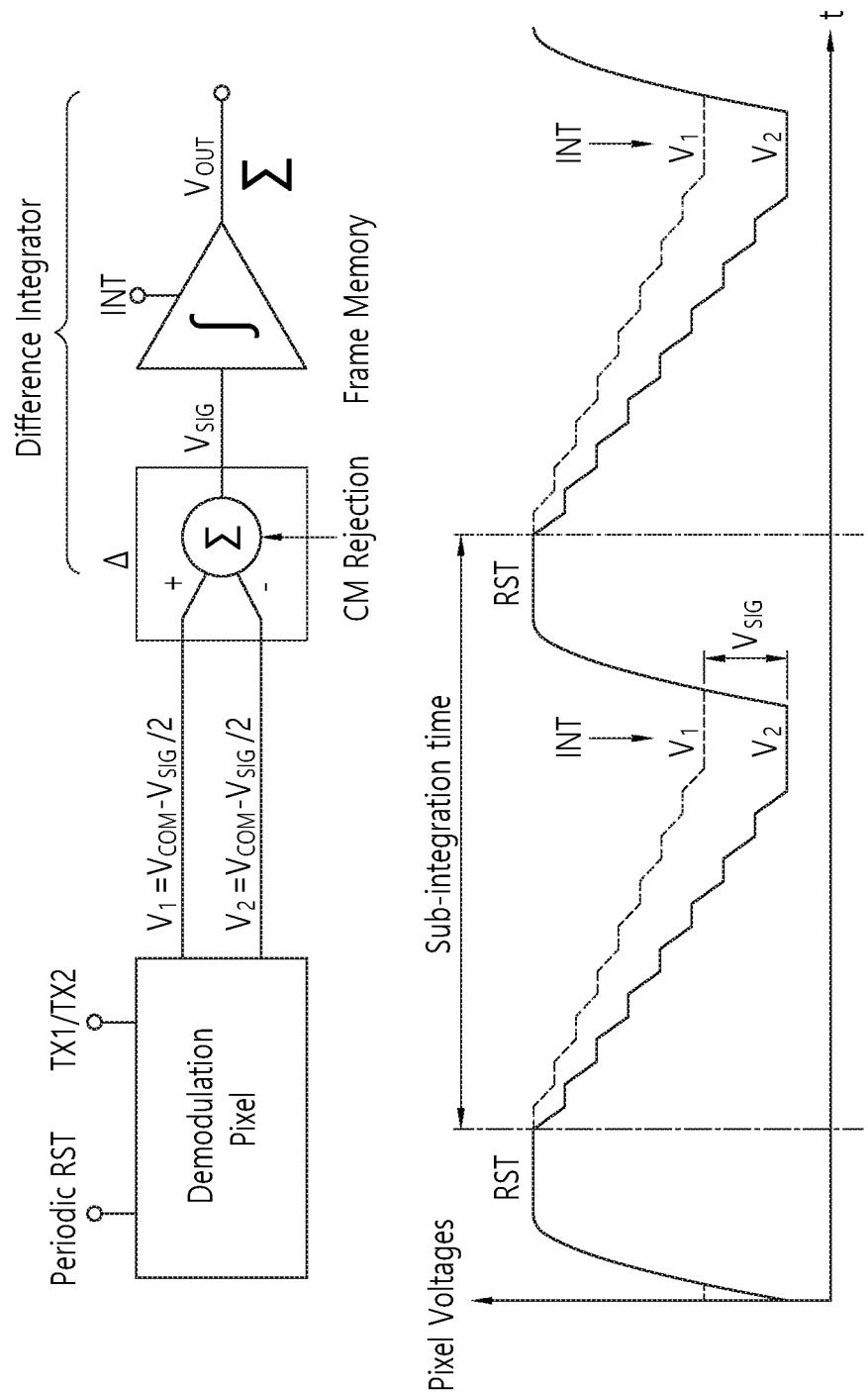
FIG. 11 is a diagram for describing a delta sigma BGL suppressing operation used in embodiments of the present disclosure.

FIG. 11 is a diagram for describing a delta sigma BGL suppressing operation used in embodiments of the present disclosure.

As shown in FIG. 11, a demodulation pixel is connected to a periodic RST and transfer switches $TX_1$ and $TX_2$, and outputs a voltage $V_1(V_1=V_{COM}+V_{SIG}/2)$ and a voltage $V_2(V_2=V_{COM}-V_{SIG}/2)$. A differential integrator calculates a voltage $V_{SIG}$ through a common mode rejection operation on the input voltages $V_1$ and $V_2$, and outputs an output voltage $V_{OUT}$ through a frame memory operation.

The delta sigma BGL suppressing operation divides an initial time $T_{int}$ into a plurality of sub-integration times $T_{sub}$. The delta sigma BGL suppressing operation reads charge amounts $Q_0$ and $Q_{180}$ at 0 degree at the respective sub integration times $T_{sub}$ to obtain a differential charge amount $\Delta Q$. In addition, the delta sigma BGL suppressing operation accumulates the differential charge amount $\Delta Q$ in an analog memory.

Figure 12:
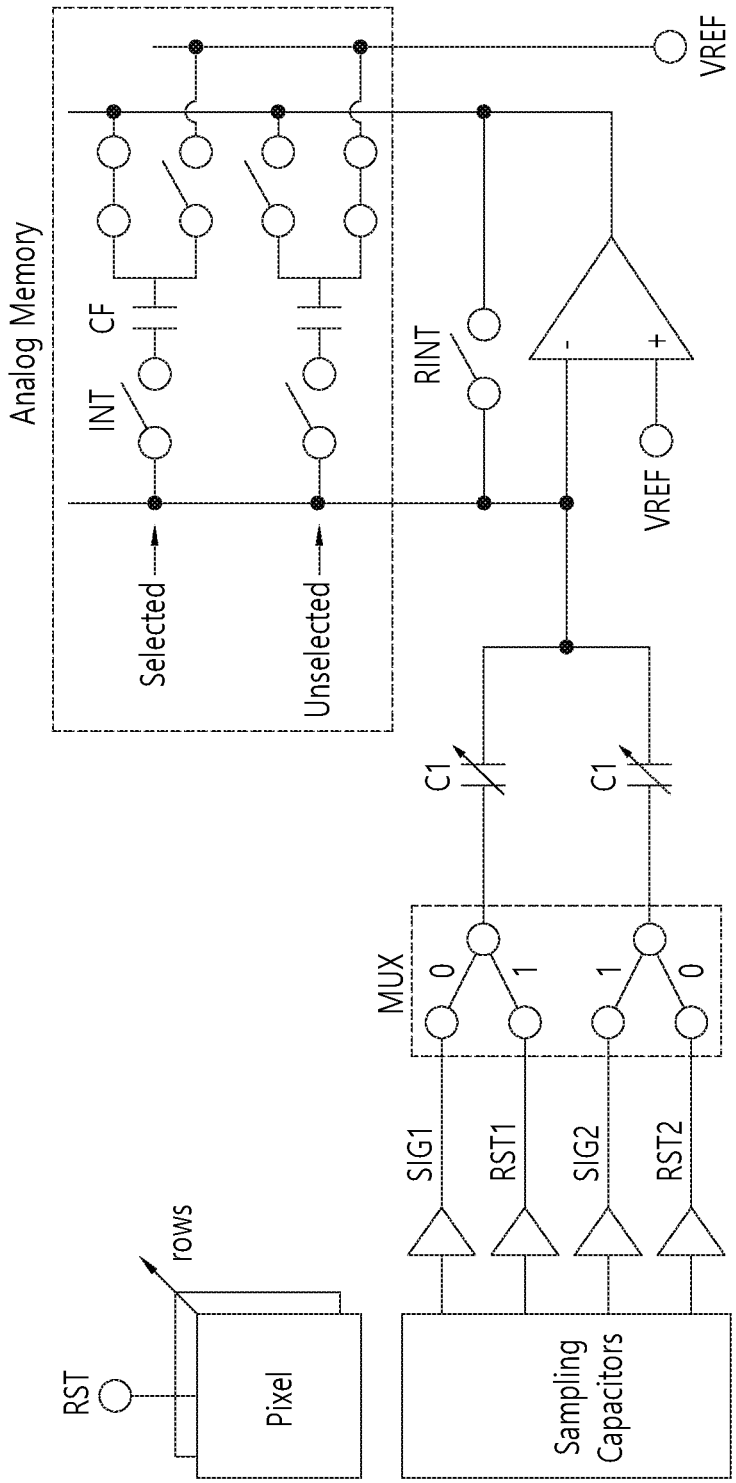
FIG. 12 is a diagram for describing a delta sigma BGL suppressing circuit used in embodiments of the present disclosure.

FIG. 12 is a diagram for describing a delta sigma BGL suppressing circuit used in embodiments of the present disclosure.

The delta sigma BGL suppressing circuit includes four sample & hold circuits and outputs $SIG_1$, $RST_1$, $SIG_2$, and $RST_2$.

The output $SIG_1$, $RST_1$, $SIG_2$, $RST_2$ are summed by a capacitive feedback amplifier. When taking a looking at double-sampling, it is found that $V_1=RST_1-SIG_1$ and $V_2=RST_2-SIG_2$. A delta operation is equivalent to $V_1-V_2=(RST_1-SIG_1)-(RST_2-SIG_2)$. A sigma operation is accumulated in a feedback cap, which is analog memory.

Figure 13:
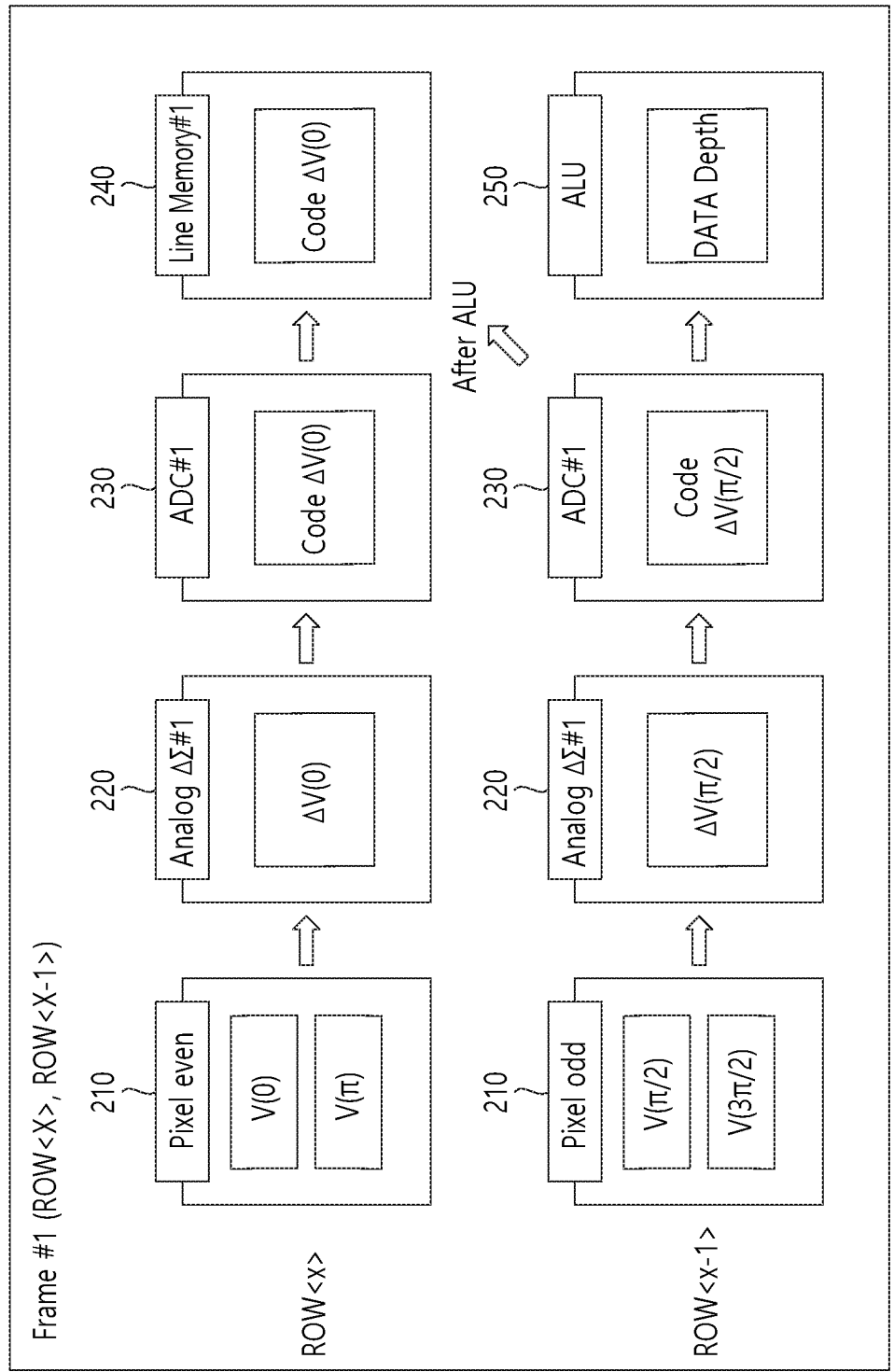
FIGS. 13 and 14 are diagrams illustrating a configuration of an apparatus for measuring a depth with a pseudo 4-tap pixel structure according to an embodiment of the present disclosure.
Figure 14:
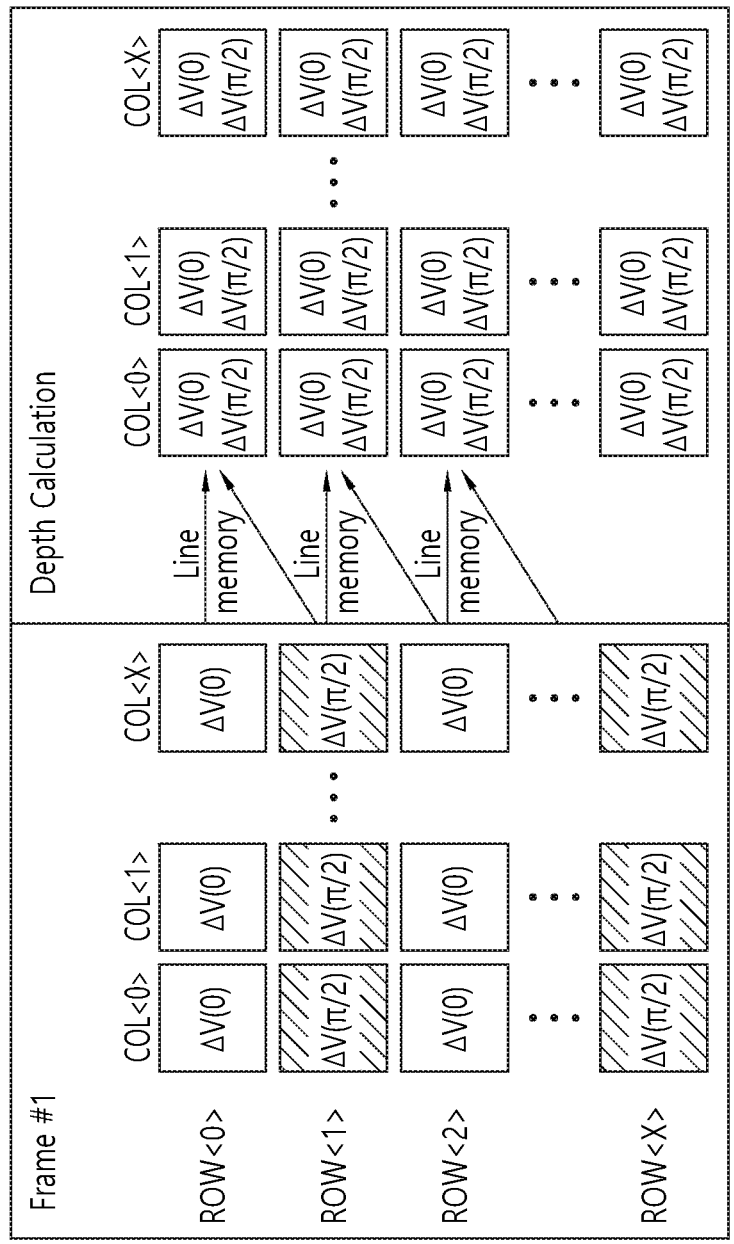

FIGS. 13 and 14 are diagrams illustrating a configuration of an apparatus for measuring a depth with a pseudo 4-tap pixel structure according to an embodiment of the present disclosure.

As shown in FIG. 13, the apparatus for measuring a depth with a pseudo 4-tap pixel structure according to an embodiment of the present disclosure may include a pixel array 210, a delta sigma circuit 220, an analog-to-digital converter (ADC) 230, a memory 240, and an arithmetic logic unit (ALU) 250. However, all the components illustrated in FIG. 13 are not essential components. An apparatus for measuring a depth with a pseudo 4-tap pixel structure may be implemented by components more or even fewer than the illustrated components.

Hereinafter, specific configurations and operations of components included in the apparatus for measuring a depth with a pseudo 4-tap pixel structure of FIG. 13 will be described.

The pixel array 210 may include even pixels corresponding to row X (ROW <X>) and odd pixels corresponding to row X-1 (ROW <X-1>). The pixel array 210 may have a structure in which the even pixels corresponding to row X (ROW <X>) and the odd pixels corresponding to row X-1 (ROW <X-1>) are repeated alternately. That is, the pixel array 210 may have a structure in which a first row line and a second row line are alternately repeated. The pixel array 210 may generate voltage values at first and second angles by a modulation pulse in a first pixel. In addition, the pixel array 210 may generate voltage values at third and fourth angles by a modulation pulse in a second pixel. Here, if the first pixel is an even pixel, the second pixel is an odd pixel, and if the first pixel is an odd pixel, the second pixel is an even pixel. A first angle may be designated as 0 degree, the second angle as 90 degrees ($\pi/2$), the third angle as 180 degrees ($\pi$), and the fourth angle as 270 degrees ($3\pi/2$). For example, the pixel array 210 may generate voltage values $V(0)$ and $V(\pi)$ at 0 degree and 180 degrees ($\pi$) by a modulation pulse on the first pixel. In addition, the pixel array 210 may generate voltage values $V(\pi/2)$ and $V(3\pi/2)$ at 90 degrees ($\pi/2$) and 270 degrees ($3\pi/2$) by a modulation pulse on the second pixel.

The delta sigma circuit 220 may calculate, through a delta sigma operation, a delta value of the first angle corresponding to the first row line of a pixel array for measuring a depth of an object. The delta sigma circuit 220 may calculate, through a delta sigma operation, a delta value of the third angle corresponding to the second row line. Here, the delta sigma circuit may perform a delta sigma operation by using voltage values at first and second angles, the voltage values generated by a modulation pulse on the first row line of the pixel array 210. The delta sigma circuit may perform a delta sigma operation by using the voltage values at the third and fourth angles, the voltage values generated by a modulation pulse on the second row line of the pixel array 210. For example, the delta sigma circuit 220 may calculate, through a delta sigma operation, a delta value $\Delta V(0)$ of 0 degree corresponding to even pixels in row x (ROW <x>). The delta sigma circuit 220 may calculate, through a delta sigma operation, a delta sigma ($\Delta/2$) of 90 degrees ($\pi/2$) corresponding to odd pixels in row x (ROW <x-1>).

The ADC 230 may convert a delta value of the first angle corresponding to the first row line, which is calculated by the delta sigma circuit 220, and a delta value of the third angle corresponding to the second row line, which is calculated by the delta sigma circuit 220, into digital codes. In one example, the ADC 230 may convert the delta value ΔV(0) of 0 degree into the code ΔV(0) through an analog-to-digital conversion operation. The ADC 230 may convert the delta value ΔV(R/2) of 90 degrees (π/2) into a code ΔV(π/2) through an analog-to-digital conversion operation.

The memory 240 may store the delta value of the first angle corresponding to the first row line, which is converted by the ADC 230. Here, the memory 240 may be implemented as a line memory.

The ALU 250 may compute depth information corresponding to the first row line by using the delta value of the first angle corresponding to the first row line, which is stored in the memory 240, and the delta value of the third angle corresponding to the second row line, which is converted in the ADC 230.

Thereafter, the memory 240 may store the delta value of the first angle corresponding to the first row line of the pixel array 210. After the stored delta value of the first angle is computed by the ALU, the memory 240 may store the delta value of the third angle corresponding to the second row line of the pixel array 210.

In addition, the ALU 250 may compute depth information corresponding to the second row line by using the delta value of the third angle corresponding to the second row line, which is stored in the memory 240, and the delta value of the first angle corresponding to the third row line. Then, the apparatus for measuring a depth with a pseudo 4-tap pixel structure may compute depth information corresponding to the first row line by using the delta value of the first angle corresponding to the first row line and the delta value of the third angle corresponding to the second row line, the respective delta values which are calculated through a delta sigma operation in each of pixels repeated alternately.

Referring to FIG. 14, an operation of an apparatus for measuring a depth with a pseudo 4-tap pixel structure according to an embodiment of the present disclosure will be described.

The pixel array 210 may generate voltage values V(0) and V(π) at 0 degree and 180 degrees (π) by a modulation pulse in even pixels corresponding to row 0 (ROW <0>) from a column COL <0> to a column COL <X>, respectively. Here, the above example is not limited to the even pixels at 0 degree and 180 degrees (π), and may be odd pixels at 90 degrees (π/2), and 270 degrees (3π/2).

Through a delta signal operation using the voltage values V(0) and V(π) generated by the pixel array 210, the delta sigma circuit 220 may calculate a delta value ΔV(0) corresponding to the even pixels corresponding to row 0 (ROW<0>). Here, the aforementioned example is not limited to the even pixels at 0 degree, but may be odd pixels at 90 degrees (π/2).

The ADC 230 may then convert the delta value ΔV(0) of 0 degree into a code ΔV(0) through an analog-to-digital conversion operation. Here, the aforementioned example is not limited to the delta value ΔV(0) of 0 degree, but may be the delta value ΔV(π/2) of 90 degrees (π/2).

The memory 240 may store the code ΔV(0) converted by the ADC 230.

Thereafter, the pixel array 210 may generate voltage values V(π/2) and V(3π/2) at 90 degrees (π/2) and 270 degrees (3π/2) by a modulation pulse in odd pixels corresponding to row 1 (ROW <1>) from the column COL <0> to the column COL <X>, respectively. Here, the aforementioned example is not limited to the odd pixels at 90 degrees (π/2) and 270 degrees (3π/2), but may be even pixels at 0 degree and 180 degrees (π).

Through a delta sigma operation using the voltage values V(π/2) and V(3π/2) generated by the pixel array 210, the delta sigma circuit 220 may calculate a delta value ΔV(π/2) of 90 degrees (π/2) corresponding to the odd pixels corresponding to row 1 (ROW<1>). Here, the aforementioned example is not limited to the odd pixels at 90 degrees (π/2), but may be even pixels at 0 degree.

The ADC 230 may then convert the delta value ΔV(π/2) of 90 degrees (π/2) into a code ΔV(π/2) through an analog-to-digital conversion operation. Here, the aforementioned example may not be limited to the delta value ΔV(π/2) of 90 degrees (π/2), but may be the delta value ΔV(0) of 0 degree.

The ALU 250 may compute depth information corresponding to row 0 (ROW<0>) by using the code ΔV(0) and the code ΔV(π/2). Here, the code ΔV(0) is a delta value of 0 degree corresponding to row 0 (ROW <0>), which is stored in the memory 240, and the code ΔV(π/2) is a delta value of 90 degrees (π/2) corresponding to row 1 (ROW>1>), which is converted by the ADC 230.

Thereafter, the memory 240 may store the code ΔV(π/2) converted by the ADC 230.

In addition, the apparatus for measuring a depth with a pseudo 4-tap pixel structure may calculate a delta value ΔV(0) of 0 degree through a delta signal operation using voltage values V(0) and V(π) corresponding to row 2 (ROW<2>), and may convert the delta value ΔV(0) of 0 degree into a code ΔV(0) through an analog-to-digital conversion operation. The apparatus for measuring a depth with a pseudo 4-tap pixel structure may compute depth information corresponding to row 1 (ROW<1>) by using the code ΔV(π/2) stored in the memory 240 and the code ΔV(0) corresponding to row 2 (ROW <2>).

Thereafter, the apparatus for measuring a depth with a pseudo 4-tap pixel structure may compute depth information corresponding to row 0 (ROW <0>) and compute depth information corresponding to remaining rows up to row x (ROW<X>) in the same manner of computing the depth information corresponding to row 1 (ROW <1>).

Figure 15:
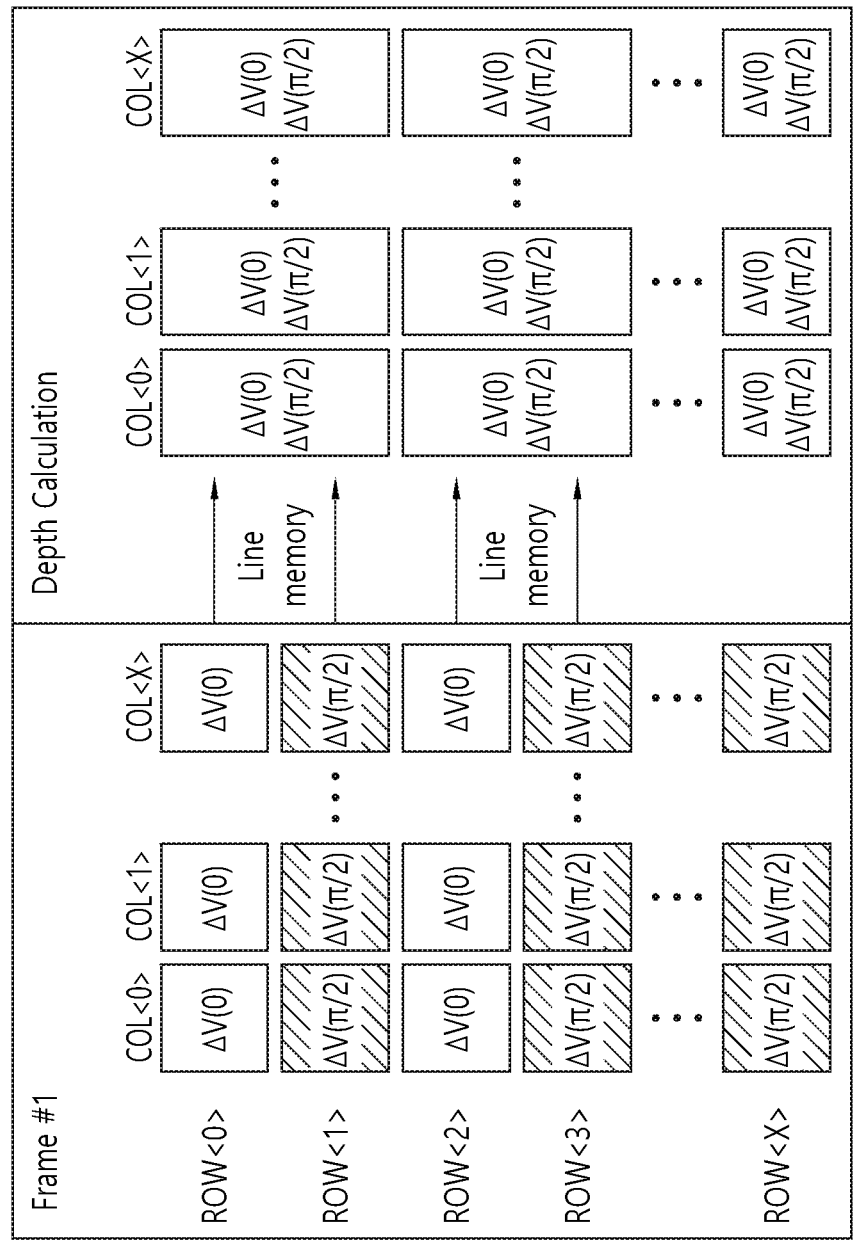
FIG. 15 is a diagram illustrating an operation of an apparatus for measuring a depth with a pseudo 4-tap pixel structure according to another exemplary embodiment of the present disclosure.

FIG. 15 is a diagram illustrating an operation of an apparatus for measuring a depth with a pseudo 4-tap pixel structure according to another exemplary embodiment of the present disclosure.

The pixel array 210 may generate voltage values at first and second angles by a modulation pulse in a first pixel. In addition, the pixel array 210 may generate voltage values at third and fourth angles by a modulation pulse in a second pixel. The pixel array 210 may have a structure in which a first row line and a second row line are alternately repeated.

The delta sigma circuit 220 may calculate, through a delta sigma operation, a delta value of the first angle corresponding to the first row line of a pixel array for measuring a depth of an object. The delta sigma circuit 220 may calculate, through a delta sigma operation, a delta value of the third angle corresponding to the second row line. Here, the delta sigma circuit 220 may perform a delta sigma operation by using voltage values at the first and second angles, the voltage values generated by a modulation pulse on the first row line of the pixel array 210. The delta sigma circuit 220 may perform a delta sigma operation by using the voltage values at the third and fourth angles, the voltage values generated by a modulation pulse on the second row line of the pixel array 210.

The ADC 230 may convert a delta value of the first angle corresponding to the first row line, which is calculated by the delta sigma circuit 220, and a delta value of the third angle corresponding to the second row line, which is calculated by the delta sigma circuit 220, into digital codes.

The memory 240 may store the delta value of the first angle corresponding to the first row line, which is converted by the ADC 230. Here, the memory 240 may be implemented as a line memory.

The ALU 250 may compute depth information corresponding to a merged line of the first and second row lines by using the delta value of the first angle corresponding to the first row line, which is stored in the memory 240, and the delta value of the third angle corresponding to the second row line, which is converted by the ADC 230. After computing the depth information corresponding to the merged line of the first and second row lines, the ALU 250 may compute depth information corresponding to a merged line of every two row lines. The apparatus for measuring a depth with a pseudo 4-tap pixel structure may perform a delta sigma operation equally on a third row line and a fourth row line, in which the first row line and the second row line are repeated. In doing so, the apparatus for measuring a depth with a pseudo 4-tap pixel structure may compute depth information corresponding to a merged line of the third and fourth row lines by using a delta value of the first angle corresponding to the third row line and a delta value of the third angle corresponding to a fourth row line.

With reference to FIG. 15, an operation of an apparatus for measuring a depth with a pseudo 4-tap pixel structure according to another embodiment of the present disclosure will be described.

The pixel array 210 may generate voltage values V(0) and V($\pi$) at 0 degree and 180 degrees ($\pi$) by a modulation pulse in even pixels corresponding to row 0 (ROW <0>) from a column COL <0> to a column COL <X>, respectively.

Through a delta signal operation using the voltage values V(0) and V($\pi$) generated by the pixel array 210, the delta sigma circuit 220 may calculate a delta value $\Delta$V(0) corresponding to the even pixels corresponding to row 0 (ROW<0>).

The ADC 230 may then convert the delta value $\Delta$V(0) of 0 degree into a code $\Delta$V(0) through an analog-to-digital conversion operation.

The memory 240 may store the code $\Delta$V(0) converted by the ADC 230.

Thereafter, the pixel array 210 may generate voltage values V($\pi$/2) and V(3$\pi$/2) at 90 degrees ($\pi$/2) and 270 degrees (3$\pi$/2) by a modulation pulse in odd pixels corresponding to row 1 (ROW <1>) from the column COL <0> to the column COL <X>, respectively.

Through a delta sigma operation using the voltage values V($\pi$/2) and V(3$\pi$/2) generated by the pixel array 210, the delta sigma circuit 220 may calculate a delta value $\Delta$V($\pi$/2) of 90 degrees ($\pi$/2) corresponding to the odd pixels corresponding to row 1 (ROW<1>).

The ADC 230 may then convert the delta value $\Delta$V($\pi$/2) of 90 degrees ($\pi$/2) into a code $\Delta$V($\pi$/2) through an analog-to-digital conversion operation.

The ALU 250 may compute depth information corresponding to a merged row line of the row 0 (ROW <0>) and row 1 (ROW <1>) by using the code $\Delta$V(0), which is a delta value of 0 degree corresponding to row 0 (ROW <0>) and stored in the memory 240, and the code $\Delta$V($\pi$/2), which is a delta value of 90 degrees ($\pi$/2) corresponding to row 1 (ROW<1>) and converted by the ADC 230.

Thereafter, the apparatus for measuring a depth with a pseudo 4-tap pixel structure may compute depth information corresponding to a merged line of row 2 (ROW <2>) and row 3 (ROW <3>) in the same manner of computing the depth information corresponding to the merged line of row 0 (ROW <0>) and row 1 (ROW <1>). That is, the apparatus for measuring a depth with a pseudo 4-tap pixel structure may compute depth information corresponding to a line into which two row lines are merged into a pair of lines.

Figure 16:
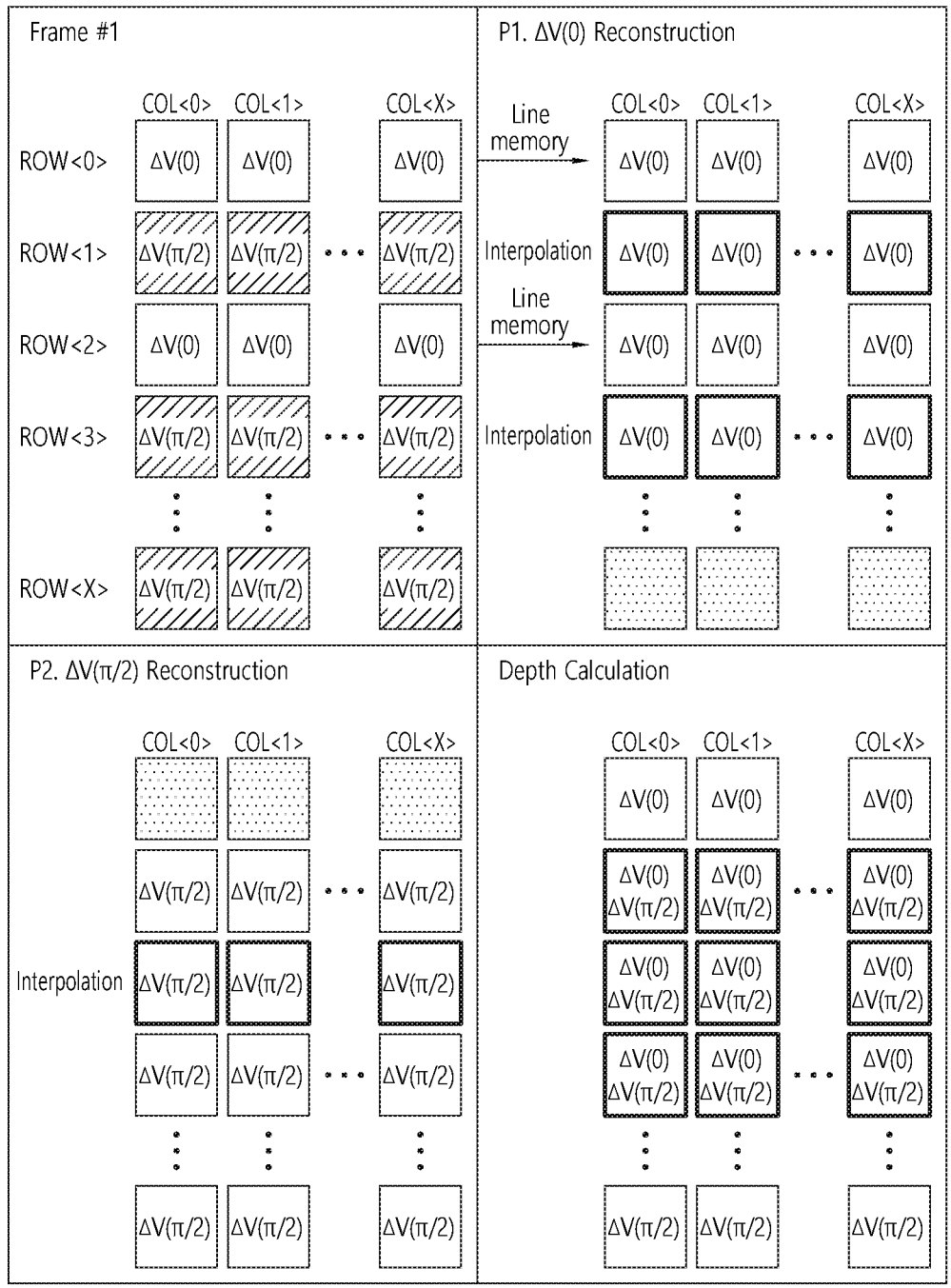
FIG. 16 is a diagram illustrating an operation of an apparatus for measuring a depth with a pseudo 4-tap pixel structure according to another exemplary embodiment of the present disclosure.

FIG. 16 is a diagram illustrating an operation of an apparatus for measuring a depth with a pseudo 4-tap pixel structure according to another exemplary embodiment of the present disclosure.

The pixel array 210 may generate voltage values at first and second angles by a modulation pulse in a first pixel. In addition, the pixel array 210 may generate voltage values at third and fourth angles by a modulation pulse in a second pixel. In addition, the pixel array 210 may generate voltage values at the first and second angles by a modulation pulse in a third pixel. The pixel array 210 may have a structure in which a first row line and a second row line are alternately repeated.

The delta sigma circuit 220 may calculate a delta value of the first angle corresponding to the first row line of the pixel array 210 for measuring a depth of an object, a delta value of the third angle corresponding to the second row line of the pixel array 210, and a delta value of the first angle corresponding to the third row line of the pixel array 210. The delta sigma circuit 220 may perform a delta sigma operation by using the voltage values at the first and second angles, the voltage values generated by a modulation pulse in the first row line of the pixel array 210. The delta sigma circuit 220 may perform a delta sigma operation by using the voltage values at the third and fourth angles, the voltage values generated by a modulation pulse on the second row line of the pixel array 210.

The ADC 230 may convert a delta value of the first angle corresponding to the first row line, which is calculated by the delta sigma circuit 220, a delta value of the third angle corresponding to the second row line, which is calculated by the delta sigma circuit 220, a delta value of the first angle corresponding to the third row line, which is calculated by the delta sigma circuit 220, and a delta value of the third angle corresponding to the second row line, which is calculated by the delta signal circuit 220, into digital codes.

The memory 240 may store the converted delta value of the first angle corresponding to the first row line, the converted delta value of the third angle corresponding to the second row line, the converted delta value of the first angle corresponding to the third row line, and the converted delta value of the third angle corresponding to the second row line. Here, the memory 240 may be implemented as a line memory.

The ALU 250 may reconstruct the delta value of the first angle corresponding to the second row line by interpolating the delta value of the first angle corresponding to the first row line, which is stored in the memory 240, and the delta value of the first angle corresponding to the third row line, which is stored in the memory 240. The ALU 250 may compute depth information for the pixels corresponding to the second row line by using the reconstructed delta value of the first angle corresponding to the second row line and the delta value of the third angle corresponding to the second row line, which is stored in the memory 240.

Thereafter, the pixel array 210 may generate voltage values at the third and fourth angles by a modulation pulse in a fourth pixel.

The delta sigma circuit 220 may calculate a delta value of the third angle corresponding to a fourth row line.

Thereafter, the ALU 250 may reconstruct the delta value of the third angle corresponding to the third row line by interpolating the delta value of the third angle corresponding to the second row line, which is stored in the memory 240, and the delta value of the third angle corresponding to the fourth row line, which is calculated by the delta sigma circuit 220.

The ALU 250 may compute depth information for the pixels corresponding to the third row pixels by using the reconstructed delta value of the third angle corresponding to the third row line and the delta value of the first angle corresponding to the third row line, which is stored in the memory 240.

With reference to FIG. 16, an operation of an apparatus for measuring a depth with a pseudo 4-tap pixel structure according to another embodiment of the present disclosure will be described.

The pixel array 210 may generate voltage values V(0) and V($\pi$) at 0 degree and 180 degrees ($\pi$) by a modulation pulse in even pixels corresponding to row 0 (ROW <0>) from a column COL <0> to a column COL <X>, respectively.

Through a delta signal operation using the voltage values V(0) and V($\pi$) generated by the pixel array 210, the delta sigma circuit 220 may calculate a delta value $\Delta V(0)$ corresponding to the even pixels corresponding to row 0 (ROW<0>).

The ADC 230 may then convert the delta value $\Delta V(0)$ of 0 degree into a code $\Delta V(0)$ through an analog-to-digital conversion operation.

The memory 240 may store the code $\Delta V(0)$ corresponding to row 0 (ROW <0>), which is converted by the ADC 230.

Thereafter, the pixel array 210 may generate voltage values V($\pi$/2) and V($3\pi$/2) at 90 degrees ($\pi$/2) and 270 degrees ($3\pi$/2) by a modulation pulse in odd pixels corresponding to row 1 (ROW <1>) from the column COL <0> to the column COL <X>, respectively.

Through a delta sigma operation using the voltage values V($\pi$/2) and V($3\pi$/2) generated by the pixel array 210, the delta sigma circuit 220 may calculate a delta value $\Delta V(\pi/2)$ of 90 degrees ($\pi$/2) corresponding to the odd pixels corresponding to row 1 (ROW<1>).

The ADC 230 may then convert the delta value $\Delta V(\pi/2)$ of 90 degrees ($\pi$/2) into a code $\Delta V(\pi/2)$ through an analog-to-digital conversion operation.

The memory 240 may store the code $\Delta V(\pi/2)$ corresponding to row 1 (ROW <1>), which is converted by the ADC 230.

Thereafter, the apparatus for measuring a depth with a pseudo 4-tap pixel structure may calculate a delta value $\Delta V(0)$ corresponding to row 2 (ROW <2>).

In operation P1, the ALU 250 may reconstruct the delta value $\Delta V(0)$ corresponding to row 1 (ROW <1>) by interpolating the delta value $\Delta V(0)$ corresponding to row 0 (ROW <0>), which is stored in the memory 240, and the calculated delta value $\Delta V$ corresponding to the row 2 (ROW <2>). Then, the ALU 250 may compute depth information corresponding to row 1 (ROW<1>) by using the reconstructed delta value $\Delta V(0)$ corresponding to row 1 (ROW <1>) and the delta value $\Delta V(\pi/2)$ corresponding to row 1 (ROW<1>), which is stored in the memory 240. Here, it is not possible to reconstruct the delta value $\Delta V(0)$ corresponding to row X (ROW <X>).

Thereafter, the apparatus for measuring a depth with a pseudo 4-tap pixel structure may calculate a delta value $\Delta V(\pi/2)$ corresponding to row 3 (ROW <3>), convert the calculated delta value $\Delta V(\pi/2)$, and store the converted delta value $\Delta V(\pi/2)$ in the memory 240.

In operation P2, the ALU 250 may reconstruct the delta value $\Delta V(\pi/2)$ corresponding to row 2 (ROW <2>) by interpolating the delta value $\Delta V(\pi/2)$ corresponding to row 1 (ROW <1>), which is stored in the memory 240, and the calculated delta value $\Delta V(\pi/2)$ corresponding to row 3 (ROW <3>). The ALU 250 may compute depth information corresponding to row 2 (ROW <2>) by using the reconstructed delta value $\Delta V(\pi/2)$ corresponding to the reconstructed row 2 (ROW <2>) and the delta value $\Delta V(0)$ corresponding to row 2 (ROW <2>) stored in the memory 240. This operation is performed repeatedly until row x. Here, it is not possible to reconstruct the delta value $\Delta V(\pi/2)$ corresponding to row 0 (ROW <0>).

For interpolation of a delta value $\Delta V(0)$, the apparatus for measuring a depth with a pseudo 4-tap pixel structure may calculate a delta value $\Delta V(0)$ in every other row and store the calculated delta value $\Delta V(0)$ in the memory 240. For example, the apparatus for measuring a depth with a pseudo 4-tap pixel structure may calculate the delta value $\Delta V(0)$ in sequence from row 2 (ROW <2>), row 4 (ROW <4>), . . . , to row X-1 (ROW<X-1>), and store the calculated delta value $\Delta V(0)$ in the memory 240.

Similarly, for interpolation of a delta value $\Delta V(\pi/2)$, the apparatus for measuring a depth with a pseudo 4-tap pixel structure may calculate a delta value $\Delta V(\pi/2)$ in every other row and store the calculated delta value $\Delta V(\pi/2)$ in the memory 240. For example, the apparatus for measuring a depth with a pseudo 4-tap pixel structure may calculate the delta value $\Delta V(\pi/2)$ in sequence from row 3 (ROW <3>), row 5 (ROW <5>), . . . , to row X (ROW<X>), and store the calculated delta value $\Delta V(\pi/2)$ in the memory 240.

Thereafter, the ALU 250 may reconstruct the delta value $\Delta V(0)$ corresponding to row 1 (ROW <1>), row 3 (ROW <3>), . . . , and row x-2 (ROW <X-2>) in the same manner as in operation P1. In addition, the ALU 250 may reconstruct the delta value $\Delta V(\pi/2)$ corresponding to row 2 (ROW <2>), row 4 (ROW <4>), . . . , and row x-1 (ROW <X-1>) in the same manner as in operation P2.

By using the delta value $\Delta V(0)$ and the delta value $\Delta V(\pi/2)$ corresponding to each row line, the ALU 250 may compute depth information corresponding to row 1 (ROW <1>), row 2 (ROW <2>), row 3 (ROW <3>), . . . , row x-2 (ROW <X-2>), and row x-1 (ROW <X-1>), except for the first row line row 0 (ROW <0) and the last row line row x (ROW <X>).

Meanwhile, through embodiments of the present disclosure, it is not necessary to use a frame memory and it is possible to increase the frame rate of the system. The frame memory may include the number of pixel arrays (e.g., 320×240)×ADC bit resolution (e.g., 10 bits).

Figure 17:
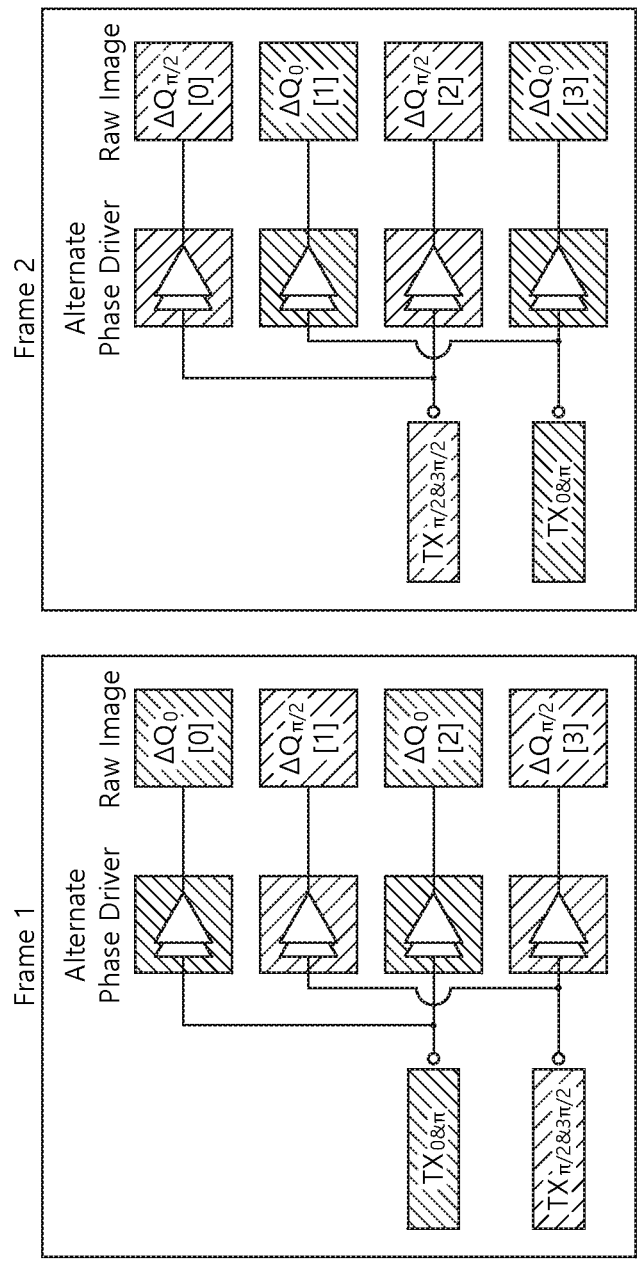
FIGS. 17 through 19 illustrate an operation of an alternate phase driver in an apparatus for measuring a depth with a pseudo 4-tap pixel structure according to another exemplary embodiment of the present disclosure.
Figure 18:
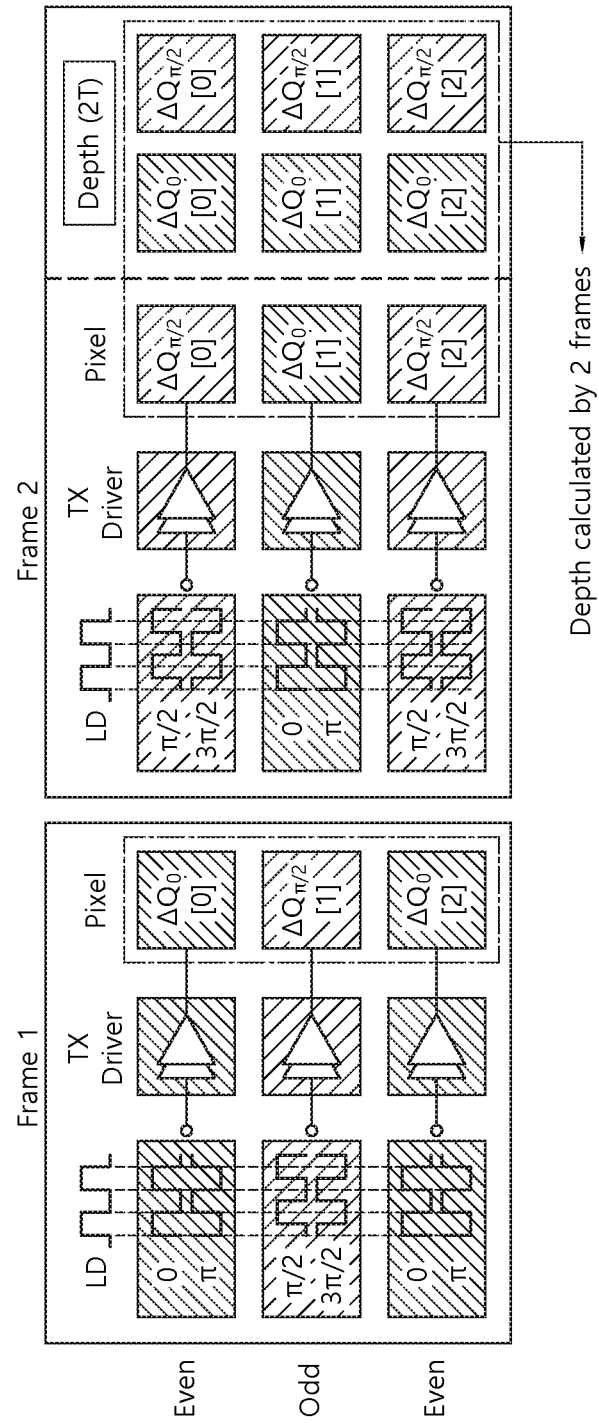
Figure 19:
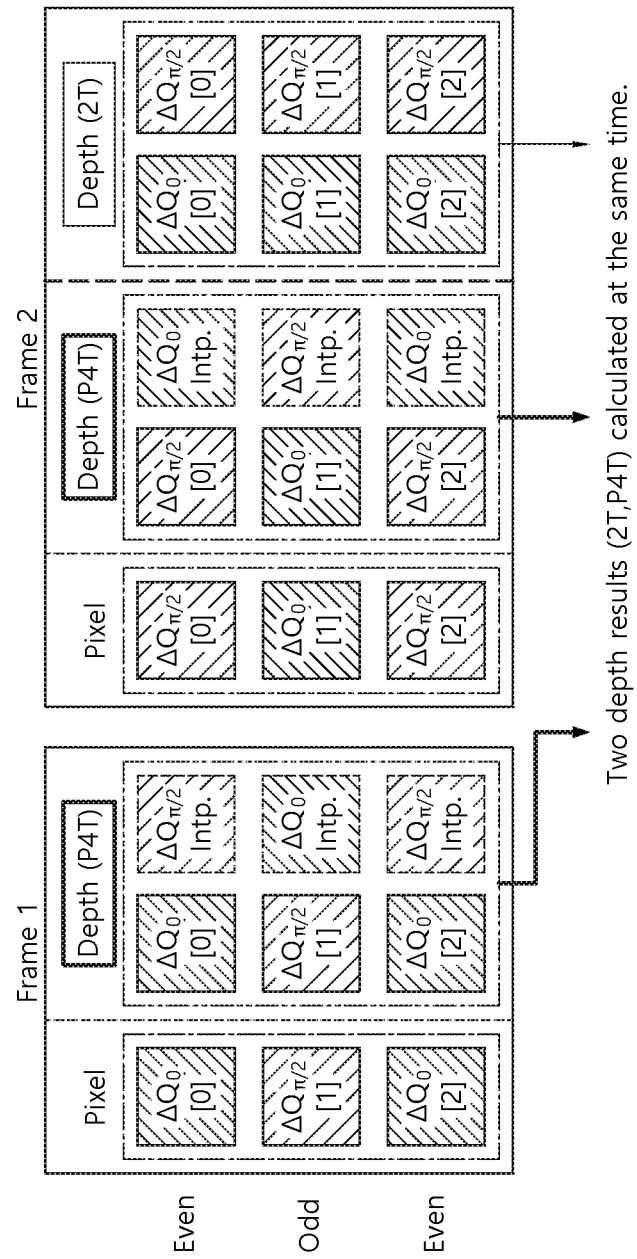

FIGS. 17 through 19 illustrate an operation of an alternate phase driver in an apparatus for measuring a depth with a pseudo 4-tap pixel structure according to another exemplary embodiment of the present disclosure.

As illustrated in FIGS. 17 and 18, an apparatus for measuring a depth with a pseudo 4-tap pixel structure according to another embodiment of the present disclosure may further include an alternate phase driver. The alternate phase driver performs an alternate phase operation for alternately outputting different phases on the same row line of each frame.

The alternate phase driver is a driver that alternately outputs an even transmission (TX) signal and an odd TX signal for every frame. The apparatus for measuring a depth with pseudo 4-tap pixel structure may calculate a depth based on two frames by performing an alternate phase operation while maintaining a different phase driving method for even rows and odd rows, respectively. Here, the alternate phase operation refers to performing different phase driving operations on the same row for each frame.

Therefore, as shown in FIG. 19, the apparatus for measuring a depth with a pseudo 4-tap pixel structure may obtain a depth 2T calculated based on the last two frames and a depth 4T calculated based on one frame.

Figure 20:
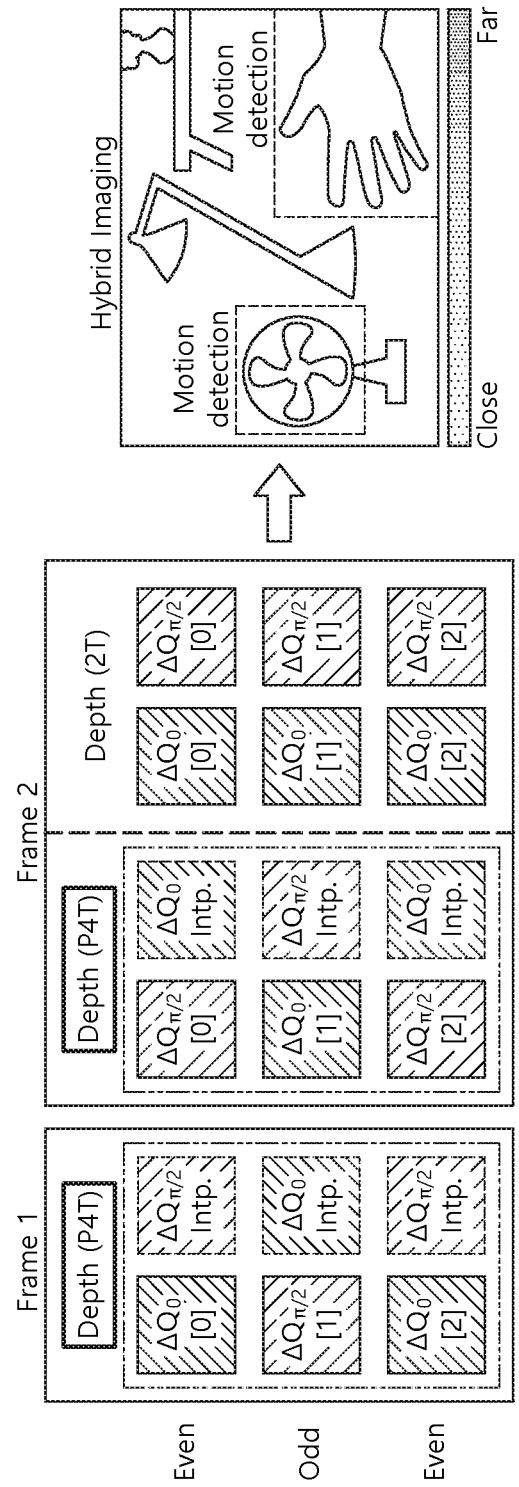
FIGS. 20 and 21 are diagrams illustrating a hybrid depth imaging operation by an apparatus for measuring a depth with a pseudo 4-tap pixel structure according to another exemplary embodiment of the present disclosure.
Figure 21:
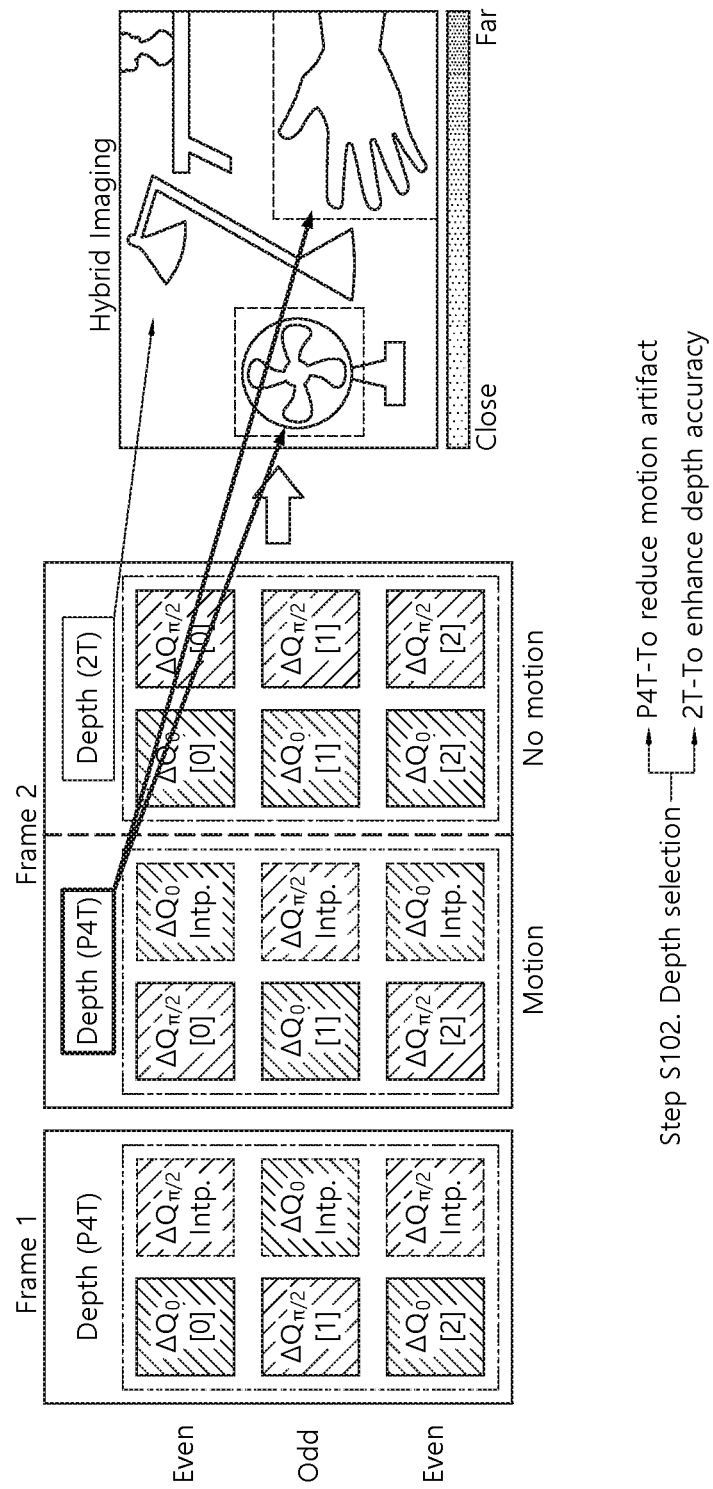

FIGS. 20 and 21 are diagrams illustrating a hybrid depth imaging operation by an apparatus for measuring a depth with a pseudo 4-tap pixel structure according to another exemplary embodiment of the present disclosure.

The hybrid depth imaging operation may output a depth through the operation of a pseudo 4-tap in Frame 1, and may also output a depth in Frame 2 as well.

At this time, if a motion does not occur when the depth data of the two frames is compared, the apparatus for measuring a depth with a 4-tap pixel structure may output a more accurate depth by using two signals that are respectively output to Frame 1 and Frame 2 through the alternate phase driver.

As shown in FIG. 20, in operation S101, in order to perform hybrid depth imaging, the apparatus for measuring a depth with a pseudo 4-tap pixel structure may detect a motion using a depth P4T calculated in each frame. Here, the motion is detected with respect to a moving object. In this case, the apparatus for measuring a depth with a pseudo 4-tap pixel structure may perform motion detection by comparing a pixel data difference of two depths with a predetermined threshold. The apparatus for measuring a depth with a pseudo 4-tap pixel structure may output frame difference data on the assumption that a motion occurs when the pixel data difference is greater than the predetermined threshold.

As shown in FIG. 21, in operation S102, the apparatus for measuring a depth with a pseudo 4-tap pixel structure may use the depth P4T at a portion where a motion occurs based on the above-described frame difference data, and may use the depth 2T at a portion where a motion does not occur. The depth P4T may be to reduce motion artifacts. The depth 2T may be to improve a distance accuracy.

In other words, a motion artifact may occur when a depth is calculated based on raw images of Frames 1 and 2. However, as described above, the apparatus for measuring a distance with a pseudo 4-tap pixel structure may obtain a hybrid image by using a depth P4T at a portion where a motion occurs and a depth 2T at a portion where a motion does not occur. As a result, a depth image with improved motion artifact and resolution may be obtained.

Figure 22:
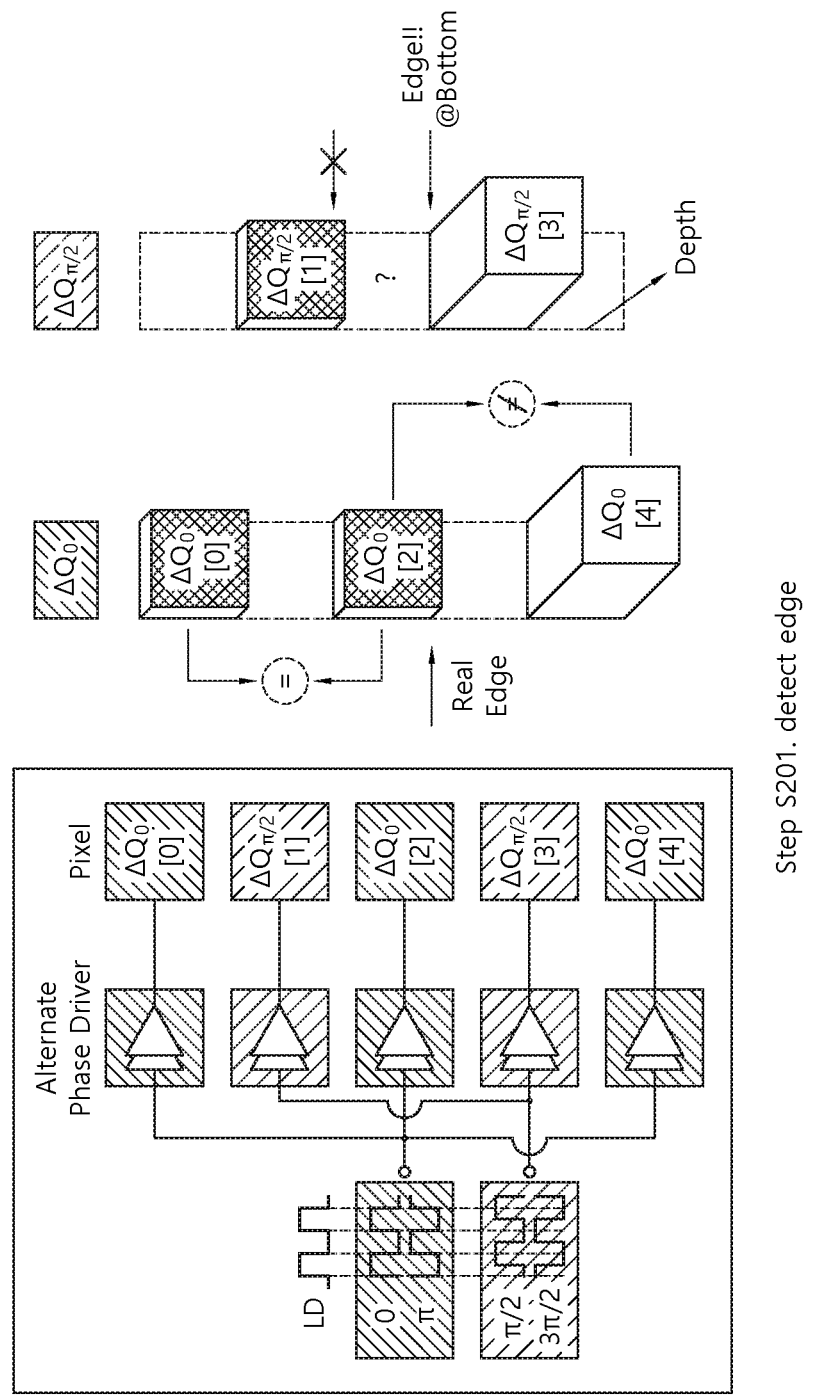
FIGS. 22 through 24 are diagrams illustrating an edge-enhanced interpolating operation of an apparatus for measuring a depth with a pseudo 4-tap pixel structure according to another embodiment of the present disclosure.
Figure 23:
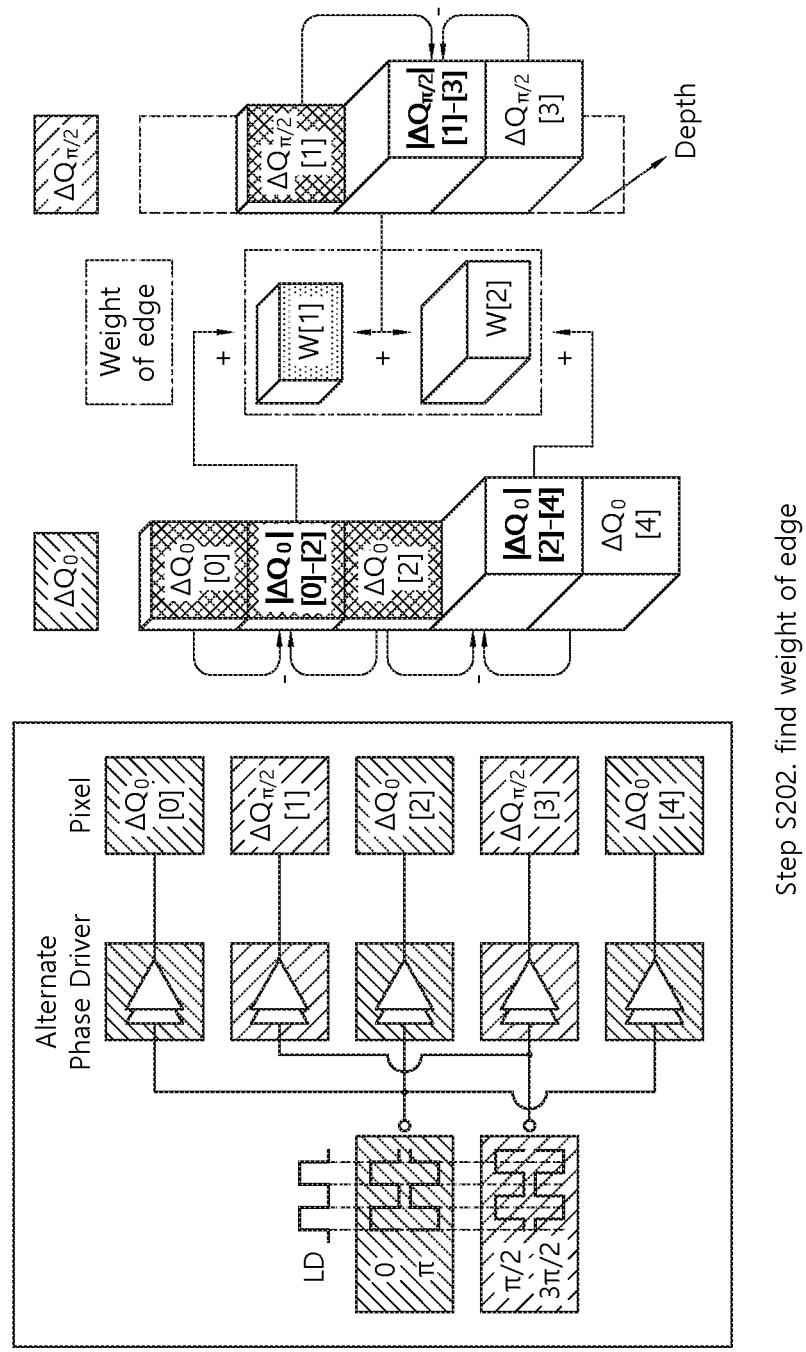
Figure 24:
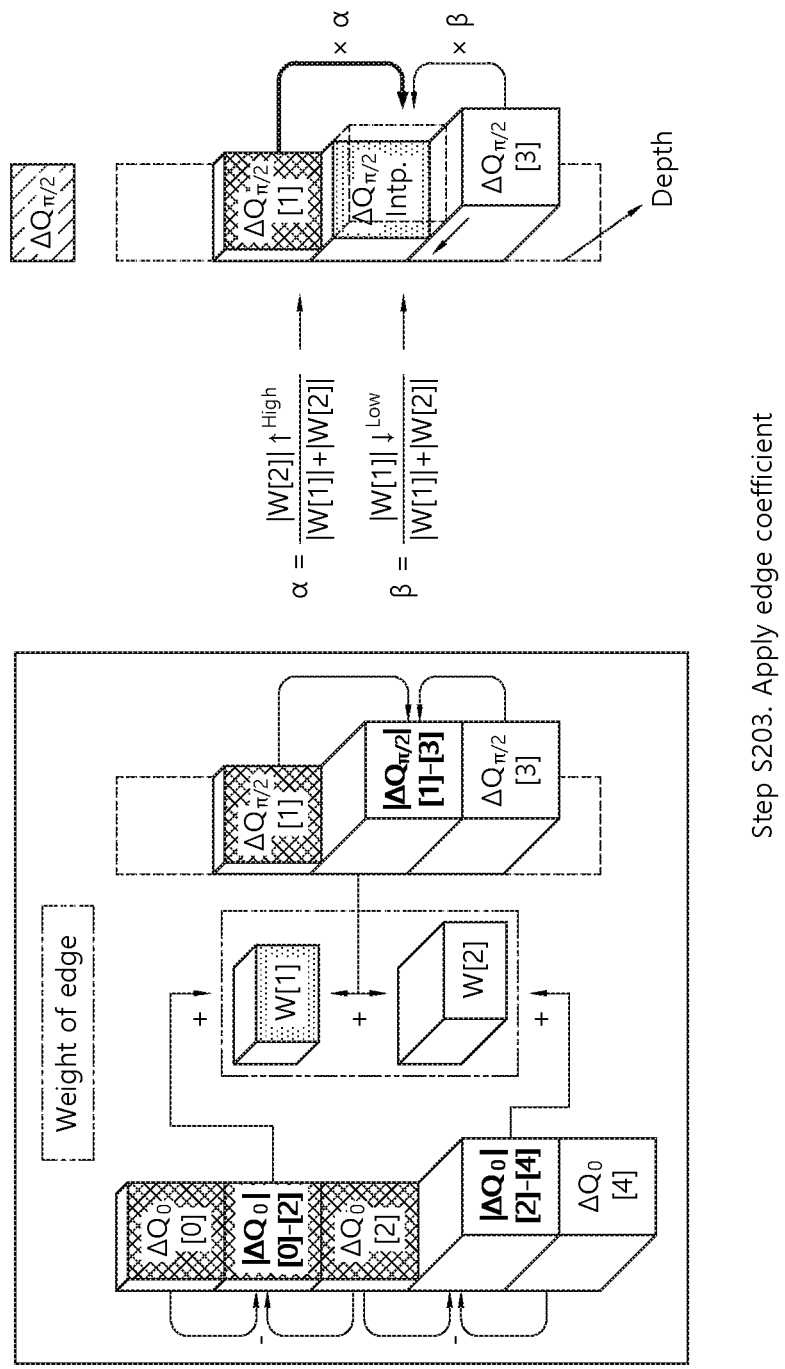

FIGS. 22 through 24 are diagrams illustrating an edge-enhanced interpolating operation of an apparatus for measuring a depth with a pseudo 4-tap pixel structure according to another embodiment of the present disclosure.

Since edge information is important for a depth image, the edge-enhanced interpolating operation of the apparatus for measuring a depth with a pseudo 4-tap pixel structure is a method in which an edge is recognized and a weight is added to data of a non-edge part in order to perform interpolation.

If the interpolation is performed using an existing linear interpolation scheme, edge degradation may be resulted.

On the contrary, the apparatus for measuring a depth with a pseudo 4-tap pixel structure according to another embodiment of the present disclosure may apply a weighted coefficient to enhance an edge, thereby preventing edge degradation.

When an edge occurs at an intermediate position in actual data, it is not possible to find the edge if $\Delta Q_{\pi/2}$ is considered alone. However, if all pixel data is used, edge may be determined using $\Delta Q_0$. It is because $\Delta Q_0$ and $\Delta Q_{\pi/2}$ have the same edge information.

As shown in FIG. 22, in operation S201, when data of an upper row and a lower row is compared using $\Delta Q_0$ and determined as not the same, the apparatus for measuring a depth with a pseudo 4-tap pixel structure may detect that an edge has occurred. The apparatus for measuring a depth with a pseudo 4-tap pixel structure compares $\Delta Q_0[0]$ and $\Delta Q_0[2]$ and may identify that edge information is the same. The apparatus for measuring a depth with a pseudo 4-tap pixel structure may compare $\Delta Q_0[2]$ and $\Delta Q_0[4]$ to identify that edge information is not the same, and detect an edge.

As shown in FIG. 23, in operation S202, the apparatus for measuring a depth with a pseudo 4-tap pixel structure may calculate a weight of edge. To formulate the weight of edge, the following method may be used. The apparatus for measuring a depth with a pseudo 4-tap pixel structure may add $|\Delta Q_0|[0]-[2]$, which is a difference between upper and lower row values of $\Delta Q_0$, and $|\Delta Q_{\pi/2}|[0]-[2]$, which is a difference between upper and lower row values of $\Delta Q_{\pi/2}$. In doing so, the apparatus for measuring a depth with a pseudo 4-tap pixel structure may obtain the weight of edge such as W[1] and W[2].

As shown in FIG. 24, in operation S203, the apparatus for measuring a depth with a pseudo 4-tap pixel structure may obtain edge coefficients α and β by using the calculated weight of edge and applies the obtained edge coefficients. The edge coefficients α and β may be $$\alpha = \frac{|W[2]|}{|W[1]| + |W[2]|} \text{ and } \beta = \frac{|W[1]|}{|W[1]| + |W[2]|}.$$

For example, W[2] may be greater than W[1] because an edge occurs from below, as shown in the left-hand side of FIG. 24. Therefore, since the value of a is greater, edge degradation may be prevented.

As such, the apparatus for measuring a depth with a pseudo 4-tap pixel structured may calculate weights of edge by adding differences between delta values of predetermined angles in adjacent row lines, and interpolate a portion where an edge occurs by using edge coefficients calculated from the weights of edge.

Although the present disclosure is described above with reference to the drawings and embodiments, the scope of the present disclosure should not be limited the drawings or embodiments, and it will be understood by those of ordinary skills in the art that various changes, substitutions and alterations may be made herein without departing from the scope of the present disclosure as defined by the following claims.

Specifically, the features described may be implemented in digital electronic circuitry, or in computer hardware, firmware, or in combinations thereof. The features may be implemented in a computer program product embodied in storage in a machine readable storage device, for example, for execution by a programmable processor. In addition, the features may be performed by a programmable processor executing a program of instructions to perform functions of the described implementations by operating on input data and generating output. The described features may be implemented in one or more computer programs that are executable on a programmable system including at least one programming processor coupled to receive data and instructions from, and to transmit data and instructions to, a data storage program, at least one at least one input device, and at least one output. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Storage devices suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, application-specific integrated circuits (ASICs).

The above-described present disclosure has been described based on a series of functional blocks, but it is not limited by the above-described embodiment and attached drawings, and it is obvious to one of ordinary skill in the art that embodiments may be substituted, modified, and changed within the scope of the technical concept of the present disclosure.

The combination of the above-described embodiments is not limited to the above-described embodiments, and various forms of combinations as well as the above-described embodiments may be provided according to implementation and/or need.

In the above-described embodiments, methods are described based on a flowchart as a series of operations or blocks, but the present disclosure is not limited to the order of operations, and some operations may be performed in a different other or simultaneously. Further, one of ordinary skill in the art would easily understand that operations in the flowchart are not exclusive, another operation may be added, or one or more operations in the flowchart may be deleted without affecting the scope of the present disclosure.

The above-described embodiments include various forms of examples. It is not possible to describe all possible combinations for indicating various forms, but one of ordinary skill in the art would easily recognize the possibility of other combinations. Hence, it should be understood that the present disclosure includes all other substitutions, modifications, and changes within the scope of claims below.

What is claimed is:

1. An apparatus for measuring a depth with a pseudo 4-tap pixel structure, the apparatus comprising:
a delta sigma circuit configured to calculate, through a delta sigma operation, a delta value of a first angle corresponding to a first row line of a pixel array for measuring a depth of an object and calculate, through a delta sigma operation, a delta value of a third angle corresponding to a second row line of the pixel array;
a memory configured to store the calculated delta value of the first angle corresponding to the first row line; and
an arithmetic logic unit (ALU) configured to compute depth information corresponding to the first row line by using the stored delta value of the first angle corresponding to the first row line and the calculated delta value of the third angle corresponding to the second row line.

2. The apparatus of claim 1, further comprising an analog-to-digital converter (ADC) configured to convert the calculated delta value of the first angle corresponding to the first row line and the calculated delta value of the third angle corresponding to the second row line into digital codes.

3. The apparatus of claim 1, wherein the delta sigma circuit is configured to perform a delta sigma operation by using voltage values at the first angle and a second angle, the voltage values generated by a modulation pulse on the first row line of the pixel array.

4. The apparatus of claim 1, wherein the delta sigma circuit is configured to perform a delta sigma operation by using voltage values at the third angle and a fourth angle, the voltage values generated by a modulation pulse on the second row line of the pixel array.

5. The apparatus of claim 1, wherein the pixel array has a structure in which the first row line and the second row line are alternately repeated.

6. The apparatus of claim 1, wherein the memory is configured to:
store the delta value of the first angle corresponding to the first row line of the pixel array; and
after the stored delta value of the first angle is computed by the ALU, store the delta value of the third angle corresponding to the second row line of the pixel array.

7. The apparatus of claim 1, wherein the ALU is configured to compute depth information corresponding to the second row line by using the stored delta value of the third angle corresponding to the second row line and a delta value of the first angle corresponding to a third row line.

8. An apparatus for measuring a depth with a pseudo 4-tap pixel structure, the apparatus comprising:
a delta sigma circuit configured to calculate, through a delta sigma operation, a delta value of a first angle corresponding to a first row line of a pixel array for measuring a depth of an object and calculate, through a delta sigma operation, a delta value of a third angle corresponding to a second row line of the pixel array;
a memory configured to store the calculated delta value of the first angle corresponding to the first row line; and
an arithmetic logic unit (ALU) configured to compute depth information corresponding to a merged line of the first and second row lines by using the stored delta value of the first angle corresponding to the first row line and the calculated delta value of the third angle corresponding to the second row line.

9. The apparatus of claim 8, further comprising an analog-to-digital converter (ADC) configured to convert the calculated delta value of the first angle corresponding to the first row line and the calculated delta value of the third angle corresponding to the second row line into digital codes.

10. The apparatus of claim 8, wherein the delta sigma circuit is configured to perform a delta sigma operation by using voltage values at the first angle and a second angle, the voltage values generated by a modulation pulse on the first row line of the pixel array.

11. The apparatus of claim 8, wherein the delta sigma circuit is configured to perform a delta sigma operation by using voltage values at the third angle and a fourth angle, the voltage values generated by a modulation pulse on the second row line of the pixel array.

12. The apparatus of claim 8, wherein the pixel array has a structure in which the first row line and the second row line are alternately repeated.

13. The apparatus of claim 8, wherein the ALU is configured to compute depth information corresponding to a merged line of every two row lines after computing the depth information corresponding to the merged line of the first and second row lines.

14. An apparatus for measuring a depth with a pseudo 4-tap pixel structure, the apparatus comprising:
- a delta signal circuit configured to calculate a delta value of a first angle corresponding to a first row line of a pixel array for measuring a depth of an object, a delta value of a third angle corresponding to a second row line of the pixel array, and a delta value of the first angle corresponding to a third row line of the pixel array;
- a memory configured to store the calculated delta value of the first angle corresponding to the first row line, the delta value of the third angle corresponding to the second row line, and the delta value of the first angle corresponding to the third row line; and
- an arithmetic logic unit (ALU) configured to reconstruct the delta value of the first angle corresponding to the second row line by interpolating the stored delta value of the first angle corresponding to the first row line and the delta value of the first angle corresponding to the third row line, and compute depth information corresponding to the second row line by using the reconstructed delta value of the first angle corresponding to the second row line and the stored delta value of the third angle corresponding to the second row line.

15. The apparatus of claim 14, further comprising an analog-to-digital converter (ADC) configured to convert the calculated delta value of the first angle corresponding to the first row line, the calculated delta value of the third angle corresponding to the second row line, and the calculated delta value of the first angle corresponding to the third row line into digital codes.

16. The apparatus of claim 14, wherein the delta sigma circuit is configured to perform a delta sigma operation by using voltage values at the first angle and a second angle, the voltage values generated by a modulation pulse on the first row line of the pixel array.

17. The apparatus of claim 14, wherein the delta sigma circuit is configured to perform to delta sigma operation by using voltage values at the third angle and a fourth angle, the voltage values generated by a modulation pulse on the second row line of the pixel array.

18. The apparatus of claim 14, wherein the pixel array has a structure in which the first row line and the second row line are alternately repeated.

19. The apparatus of claim 14,
wherein the delta sigma circuit is configured to calculate a delta value of the third angle corresponding to a fourth row line, and
wherein the ALU is configured to reconstruct the delta value of the third angle corresponding to the third row line by interpolating the stored delta value of the third angle corresponding to the second row line and the calculated delta value of the third angle corresponding to the fourth row line.

20. The apparatus of claim 14, wherein the ALU is configured to compute depth information corresponding to the third row line by using the reconstructed delta value of the third angle corresponding to the third row line and the stored delta value of the first angle corresponding to the third row line.

21. The apparatus of claim 14, further comprising an alternate phase driver configured to perform an alternate phase operation of alternately outputting different phases on a same row line of each frame.

22. The apparatus of claim 21, wherein the ALU is configured to detect occurrence of a motion by comparing a pixel data difference with a predetermined threshold, and perform a hybrid depth imaging operation, in which a depth calculated based on one frame is used at a portion where the motion occurs and a depth calculated based on two frames is used at a portion where the motion does not occur.

23. The apparatus of claim 21, wherein the ALU is configured to calculate weights of edge by adding differences between delta values of predetermined angles on adjacent row lines, and interpolate a portion where an edge occurs by using edge coefficients calculated based on the weights of edge.

* * * * *